United States Patent [19]

Tabata et al.

[11] Patent Number: 4,610,026
[45] Date of Patent: Sep. 2, 1986

[54] METHOD OF AND APPARATUS FOR ENLARGING/REDUCING TWO-DIMENSIONAL IMAGES

[75] Inventors: Kuniaki Tabata, Tokyo; Tetsuo Machida, Sagamihara; Haruo Takeda, Machida; Naoki Takada, Hadano; Yasuyuki Okada, Sagamihara, all of Japan

[73] Assignee: Hitachi, Ltd., Tokyo, Japan

[21] Appl. No.: 489,350

[22] Filed: Apr. 28, 1983

[30] Foreign Application Priority Data

Apr. 30, 1982 [JP] Japan ................................ 57-71237
Sep. 6, 1982 [JP] Japan ................................ 57-153904

[51] Int. Cl.⁴ ............................................. G06K 9/42
[52] U.S. Cl. ..................................... 382/47; 340/728; 340/731; 358/180; 358/287; 382/54
[58] Field of Search ............................ 382/44, 47, 54; 358/138, 140, 180, 287; 364/723; 340/728, 731

[56] References Cited

U.S. PATENT DOCUMENTS

| | | | |
|---|---|---|---|
| 4,020,332 | 4/1977 | Crochiere et al. | 364/723 |
| 4,163,257 | 7/1979 | White | 358/138 |
| 4,240,113 | 12/1980 | Michael et al. | 358/180 |
| 4,381,547 | 4/1983 | Ejiri | 382/47 |

Primary Examiner—Leo H. Boudreau
Assistant Examiner—Joseph Mancuso
Attorney, Agent, or Firm—Antonelli, Terry & Wands

[57] ABSTRACT

Method of and apparatus for converting a first two-dimensional image on first column direction and row direction scales to a second two-dimensional image on second column direction and row direction scales at a high speed, in which use is made of the periodicity of the positional relation between the image elements of the first image arranged in matrix and having various data values and the image elements of the second image arranged in matrix and having various data values to determine, for each one of the second image elements, four second image elements lying on the intersections between two adjacent rows and two adjacent columns in the first image element matrix which rows and columns surround the second image element and constitute a reference from for the second image element, and in which the data value for each second image element is calculated on the basis of the data values of the four first image elements associated with the first image element and the vertical and horizontal coordinates within the reference frame. Both of the above-mentioned periodicity and the coordinates are defined in terms of the ratios between the first and second scales for the first and second two-dimensional images, i.e., magnifications.

20 Claims, 20 Drawing Figures

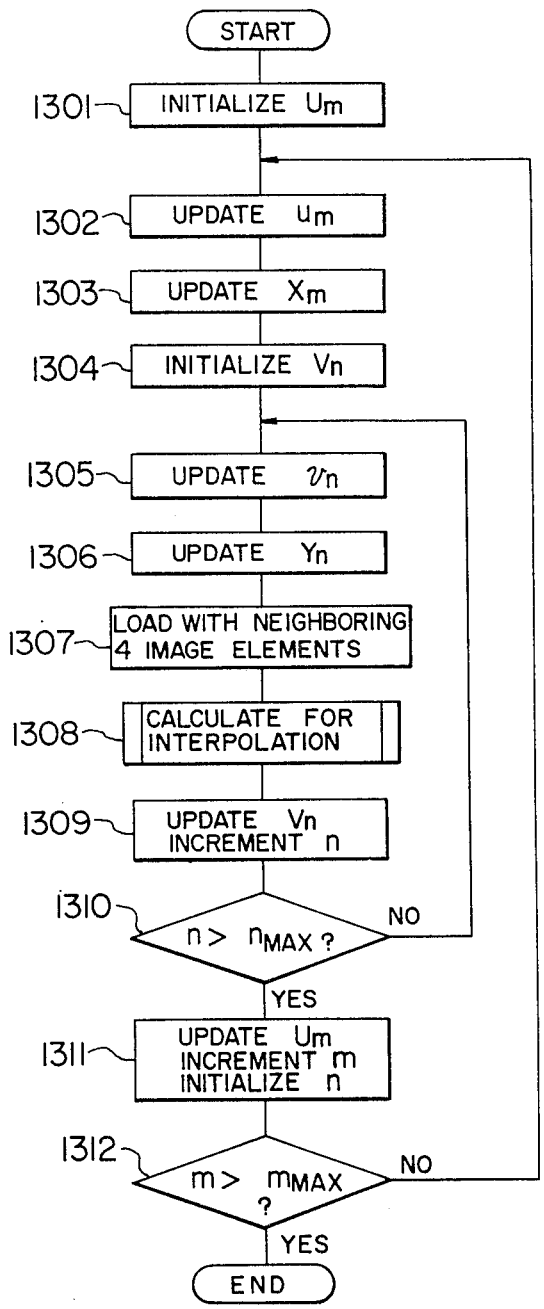

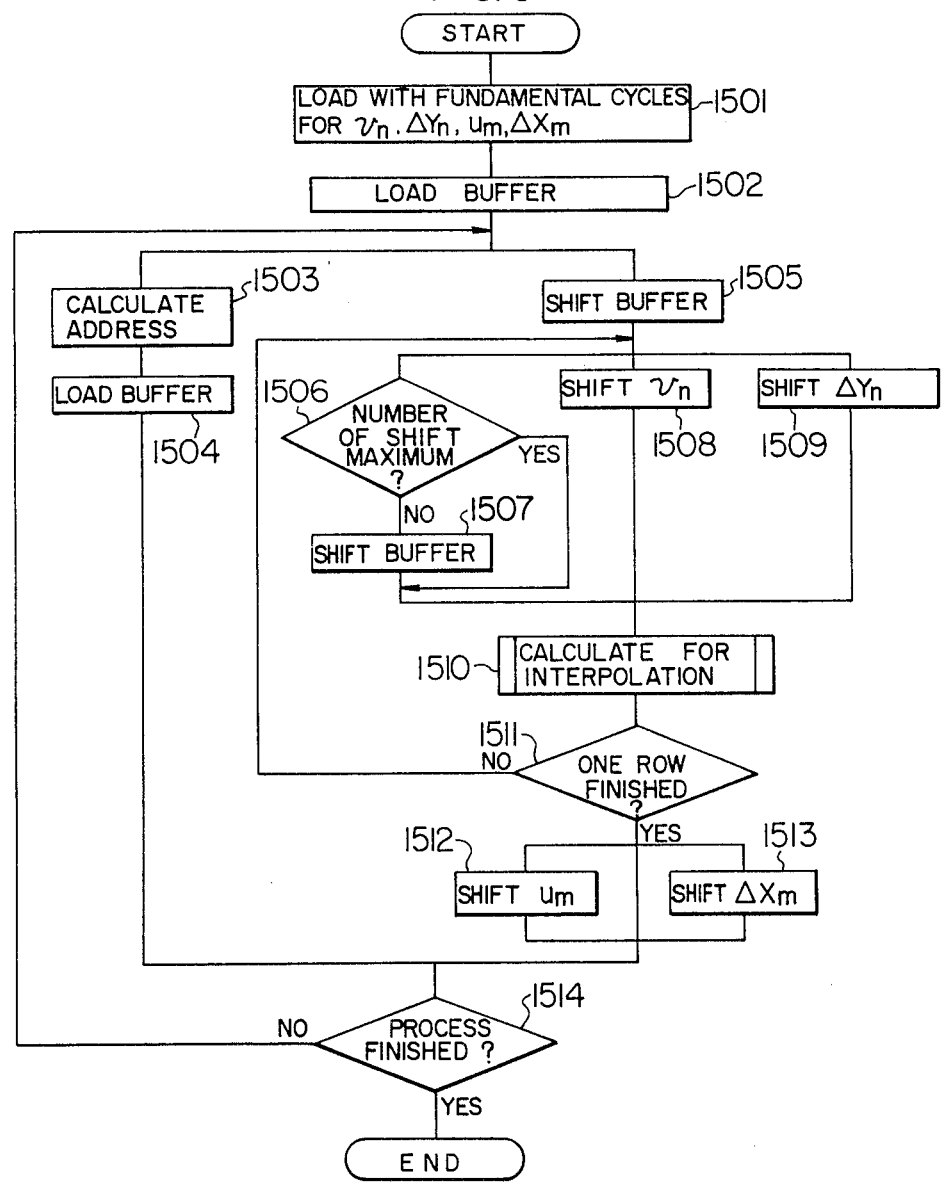

FIG. 8

| | 1 | 2 | 3 | --- | $Q_{21}$ | $Q_{22}$ | $Q_{23}$ | --- | $Q_{31}$ | $Q_{32}$ | $Q_{33}$ | --- |
|---|---|---|---|---|---|---|---|---|---|---|---|---|
| SATURATION CALCULATOR 1 | $Q_{11}$ | $Q_{12}$ | $Q_{13}$ | | | | | | | | | |
| SATURATION CALCULATOR 2 | $Q_1+L1$ | $Q_1+L2$ | $Q_1+L3$ | --- | $Q_2+L1$ | $Q_2+L2$ | $Q_2+L3$ | --- | $Q_3+L1$ | $Q_3+L2$ | $Q_3+L3$ | --- |
| SATURATION CALCULATOR 3 | $Q_1+2L1$ | $Q_1+2L2$ | $Q_1+2L3$ | --- | $Q_2+2L1$ | $Q_2+2L2$ | $Q_2+2L3$ | --- | $Q_3+2L1$ | $Q_3+2L2$ | $Q_3+2L3$ | --- |
| SATURATION CALCULATOR 4 | $Q_1+3L1$ | $Q_1+3L2$ | $Q_1+3L3$ | --- | $Q_2+3L1$ | $Q_2+3L2$ | $Q_2+3L3$ | --- | $Q_3+3L1$ | $Q_3+3L2$ | $Q_3+3L3$ | --- |

ORDER OF OUTPUTS →

$L = rx$ ⟨INTEGER⟩

(a) ORIGINAL IMAGE ELEMENT DATA (b) ENLARED/REDUCED IMAGE ELEMENT DATA

METHOD OF AND APPARATUS FOR ENLARGING/REDUCING TWO-DIMENSIONAL IMAGES

The present invention relates to a method of and apparatus for enlarging/reducing two-dimensional images, and more specifically to a method of and apparatus for converting a first two-dimensional image on first column direction and row direction scales to a second two-dimensional image on second column direction and row direction scales so that the first image is enlarged or reduced to the second image with magnifications corresponding to ratios between the first scales and the second scales, where the row and column directions in the first image are parallel with those in the second image.

The (first) two-dimensional image to be subjected to enlargement or reduction, i.e., scale conversion is a digital image made of a plurality of image elements ($P_{ij}$) arranged in matrix (i.e., in i rows and j columns) and having various data values. Similarly, the (second) two-dimensional image resulting from a scale conversion is a digital image made of a plurality of image elements ($Q_{mm}$) arranged in matrix (i.e., in m rows and n columns) and having various data values.

In this specification, some terms will be defined as follows: p Matrix point . . . An intersection between a row and a column in the above-mentioned matrices. An image element lies on a matrix point.

Original matrix . . . A matrix constituted by the image elements of the (first) two-dimensional image to be subjected to a scale conversion.

Scale-converted matrix or converted matrix . . . A matrix constituted by the image elements of the (second) two-dimensional image resulting from a scale conversion.

Generally, the image scale conversion processing of digital images is carried out through two steps as indicated below:

(1) Determination of positions of scale-converted matrix points in accordance with magnifications of the image scale conversion on the original image matrix (coordinate calculation); and (2) Calculation of data values representative of saturation levels of the converted matrix points (saturation calculation).

In a conventional image scale converting system, the coordinate calculation and saturation calculation are repetitively carried out sequentially for each of the individual image elements (matrix points). Reported in a published literature, for example, Preliminary Transactions for 20-th Nation-wide Congress of Information Processing Society of Japan, pp. 73 to 74, 1981 or G. R. Nudd: "Image understanding architechtures", Proc. of National Computer Conference, 1980 pp. 377–390 is a hardware for image scale conversion which requires about 1 (one) second for production of outputs representative of $10^6$ image elements. With this apparatus, it takes therefore about 4 seconds for processing a document of A4 size on the assumption that imaging is effected at a density of 8 image elements/mm. Reported in another published literature Study Papers IE76-78/1976 and IE78-12/1978 by The Institute of Electronics and Communication Engineers of Japan is an image scale conversion system based on a microprogram in which the processing speed is of the order of the aforementioned hardware. Also, an approach has been made to simplify the concentration calculation in the image scale conversion. Reported in Japanese Patent Application Laid-Open No. 90375/81 (Laid-open on July 22, 1981) is a system wherein saturation levels calculated in advance for all the combinations of saturation calculation are stored in a memory, and the stored saturation levels are read as desired to determine a saturation level of each individual image element (converted matrix points). According to this system, the saturation calculation can advantageously be effected by referring to a table but repetition of the coordinate calculation must be carried out sequentially in respect of the individual image elements (matrix points).

As described above, the conventional system requires repetition of the coordinate calculation and the saturation calculation in respect of the individual image elements for the sake of image scale conversion and it is unsuitable for high speed processing.

It is an object of the present invention to realize high speed image scale conversion in various types of image scale converting system.

According to one aspect of the present invention, for determination of the positions of the scale-converted matrix points on the original matrix, use is made of periodicity of the positional relation between the original matrix and the scale-converted matrix, the periodicity being defined by scale factors or magnifications (ratios between the original image scales and the scale-converted image scales).

According to another aspect of the present invention, each rectangular region of the original matrix has its column side and row side divided by r and s, respectively, to define a sub-matrix (r and s being integers larger than 1) so that the column direction and row direction magnifications $\alpha$ and $\beta$ are related with the integers r and s (hereinafter referred to as "a column side division constant" and "a row side division constant"), respectively, as $\alpha = r/k_i'$ and $\beta = s/k_j'$ ($k_i'$ and $k_j'$ being positive integers), whereby the above-mentioned periodicity of the positional relation is simplified and, at the same time, periodicity of the vertical and horizontal coordinates of the converted matrix points within the rectangular regions of the original matrix each surrounding at least one of the converted matrix points is simplified, and both periodicity thus simplified are used to determine the positions of the converted matrix points on the original matrix. The vertical and horizontal coordinates of the converted matrix points are also defined by the magnifications.

In the accompanying drawings useful for describing some preferred embodiments of the present invention:

FIG. 3 is a flowchart illustrating a processing sequence for enlargement/reduction of a digital image according to the prior art;

FIG. 4 shows an image scale conversion apparatus according to one embodiment of the present invention and FIG. 5 is a flowchart illustrating a processing sequence in the apparatus of FIG. 4;

FIGS. 7 and 8 are diagrams useful for explaining one aspect of the present invention;

FIGS. 10A and 10B illustrate the manner of storing data in the image memory shown in FIG. 9 while

Figure 1A:
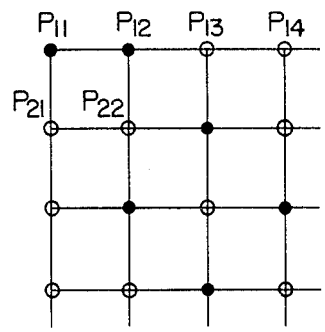
FIGS. 1A–1C are diagrams for explaining enlargement/reduction of a digital image.
Figure 1B:
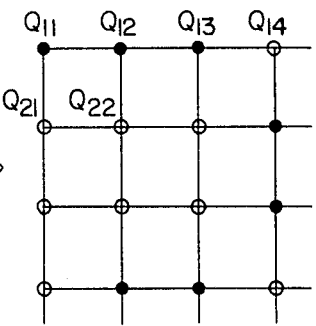
Figure 1C:
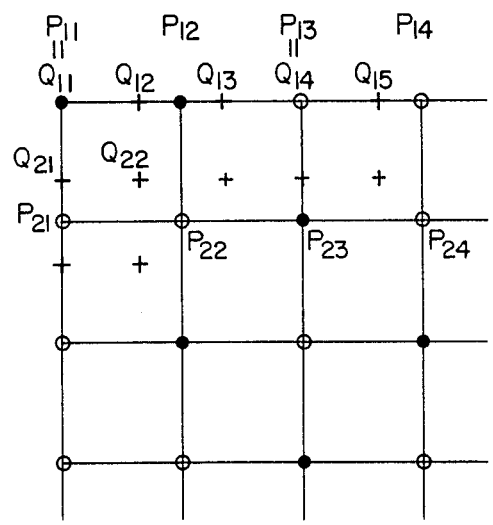

Reference will first be made to FIGS. 1A–1C to describe an image scale conversion or an enlargement/reduction of an image. FIG. 1A shows an example of an original digital image, while FIG 1B exemplarily shows a scale-converted digital image resulting from a magnification of the original image of FIG. 1A with a column direction magnification of 3/2 and a row direction magnification of 3/2. FIG. 1C is a diagram in which the enlarged (scale-converted) image of FIG. 1B is mapped onto the original image of FIG. 1A.

The image enlargement/reduction processing, i.e., the image scale conversion processing involves a determination of the converted image of FIG. 1B from the original image of FIG. 1A and is carried out through interpolation of the position and data values for the converted matrix points $Q_{11}, Q_{12}, \ldots, Q_{21}, Q_{22}, \ldots$, on the basis of the mutual positional relation between the original matrix and the converted matrix and of the data values of the original matrix points $P_{11}, P_{12}, \ldots, P_{21}, P_{22}, \ldots$, as illustrated in FIG. 1C.

For a better understanding of the present invention, explanation will now be made on an example of the scale conversion processing according to the prior art with reference to FIGS. 2 and 3.

Figure 2:
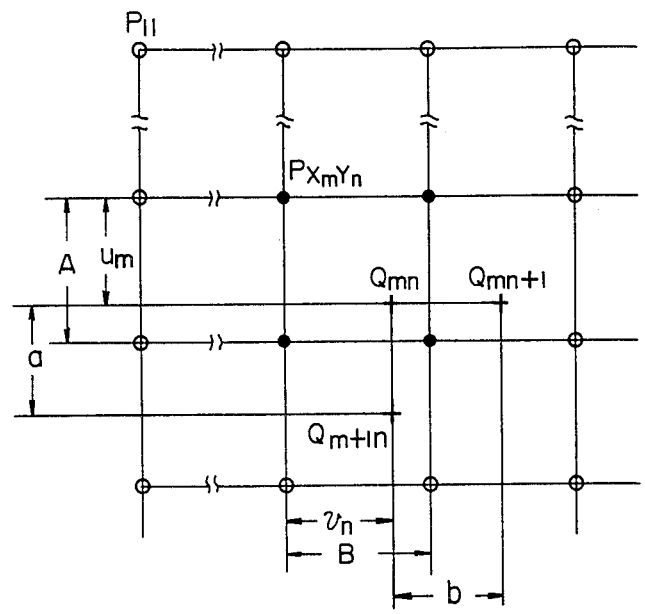
FIG. 2 is a detailed illustrative view of FIG. 1C.

In FIG. 2, which is an enlarged view of FIG. 1C, there are illustrated an interpolated point or a converted matrix point $Q_{mn}$, an upper-left point $P_{X_mY_n}$ involved in four points of a rectangular region surrounding the interpolated point $Q_{mn}$, a vertical coordinate $u_m$ of the interpolated point $Q_{mn}$ within the original image matrix, a horizontal coordinate $v_n$ of the interpolated point $Q_{mn}$, lengths A and B of the column direction side and the row direction side of a rectangular region in the original matrix and lengths a and b of the column direction side and the row direction side of a rectangular region in the converted matrix. The lengths A and B are constants specified by the system in question and the lengths a and b are constants specified by magnifications for the scale conversion. A set of information necessary for calculation of the data value representative of the level of saturation for interpolated point or converted matrix point $Q_{mn}$ includes the coordinates $u_m$, $v_n$ and the data values representative of the levels of saturation for the four original matrix points $P_{X_mY_n}$, $P_{X_m+1Y_n}$, $P_{X_mY_n+1}$ and $P_{X_m+1Y_n+1}$ surrounding the converted matrix point $Q_{mn}$.

Values of $u_m$, $v_n$, A, B, a and b are discrete since the magnifications for image scale conversion can be limited to rational numbers without causing any inconvenience for practical purposes. On this premise, the values of $u_m$, $v_n$, A, B, a and b will hereinafter be constructed as integers for simplicity of explanation.

In a conventional image scale converting system, the input information necessary for the interpolation is determined in accordance with proceedings as shown in FIG. 3 (see, for example, Preliminary Transactions for 22nd Nation-wide Congress of Information Processing Society of Japan, pp. 73 to 74, the first term of 1981).

$$V_n = Y_n \cdot B + v_n$$

$$U_m = X_m \cdot A + u_m$$

are defined.

In steps 1301, 1302, 1303, 1304, 1305 and 1306, $U_o=0$, $u_m=U_m$ mod A, $X_m=U_m/A$, $V_o=0$, $v_n=V_n$ mod B, and $Y_n=V_n/B$ are respectively loaded into an image memory. In step 1307, values for four points $P_{X_mY_n}$, $P_{X_m+1Y_n}$, $P_{X_mY_n+1}$ and $P_{X_m+1Y_n+1}$ near or surrounding the interpolated point $Q_{mn}$ are loaded into the image memory. In step 1308, results from the steps 1302, 1305 and 1307 are used as input information to calculate an interpolation. In step 1309, $V_{n+1}=V_n+b$ and $n=n+1$ are calculated, and in step 1311, $U_{m+1}=U_m+a$ and $m=m+1$ are calculated. In the above procedures, "mod" represents a remainder after division and "/" represents a divisional operation.

It has been proven that in accordance with the above procedures, it takes about 1 (one) second for obtaining a converted image of $10^6$ matrix points. This means that about 4 seconds are required to obtain a converted image of A4 size with a facsimile of 8 scanning lines/mm. Practically, in the above procedures, calculations in the steps 1305 and 1306 can be effected in parallel and calculations in the steps 1307 and 1308 can also be effected in parallel. In the parallel calculations, paths of processing in the steps 1306 and 1307 are dominant in determining the processing time.

In one aspect of the present invention, high speed image scale conversion in various types of systems is achieved by causing paths of steps 1306 and 1307 to be processed at high speeds.

More particularly, the sequences of data representative of the above-mentioned $u_m$, $v_n$, difference of $X_{m+1}-X_m$ and difference of $Y_{n+1}-Y_n$ are periodical sequences having respective fundamental cycles of a fixed period, and use is made of the periodicity of these sequences of data to increase the speed of the image scale conversion processing.

In one embodiment, the data of the fundamental cycles are initially loaded on circulating registers and the data in the registers are circulatively shifted with timing pulses for taking out necessary data.

The periodicity of the above-mentioned sequences of data may be explained as follows.

Periodicity of $v_n$ and $u_m$

As described above, $v_n=V_n$ mod B and $v_{n+1}=V_{n+b}$. Thus, for any number n $$v_{n+B}=V_{n+B} \text{ mod } B=(V_n+B\cdot b) \text{ mod } B=V_n \text{ mod } B=v_n$$

Accordingly, the sequence of data $v_n$ is a periodic sequence having a period of B or smaller and its fundamental cycle consists of $v_0, v_1, v_2, \ldots, v_{B-1}$.

Similarly, the sequences of data $u_m$ is a periodic sequence having a period of A or smaller and its fundamental cycle consists of $u_0, u_1, u_2, \ldots, u_{A-1}$.

Periodicity of $(Y_{n+1}-Y_n)$ and $(X_{m+1}-X_m)$

As described above, $BY_n=Y_n-v_n$ from this, $B(Y_{n+1}-Y_n)=b-(v_{n+1}-v_n)$. Assuming that $Y_{n+1}-Y_n=\Delta Y_n$, for any number n, $$B \cdot Y_{n+B} = b - (v_{n+B+1} - v_{n+B}) = b - (v_{n+1} - v_n) = B \cdot \Delta Y_n$$

$$\therefore Y_{n+B} = \Delta Y_n$$

Accordingly, the sequence of data $\Delta Y_n = Y_{n+1} - Y_n$ is a periodic sequence having a period of B or smaller and its fundamental cycle consists of $\Delta Y_0, \Delta Y_1, \Delta Y_2, \ldots, \Delta Y_{B-1}$.

Similarly, the sequence of data $\Delta X_m = X_{m+1} - X_m$ is a periodic sequence having a period of A or smaller and its fundamental cycle consists of $\Delta X_0, \Delta X_1, \Delta X_2, \ldots, \Delta X_{A-1}$.

Figure 4:
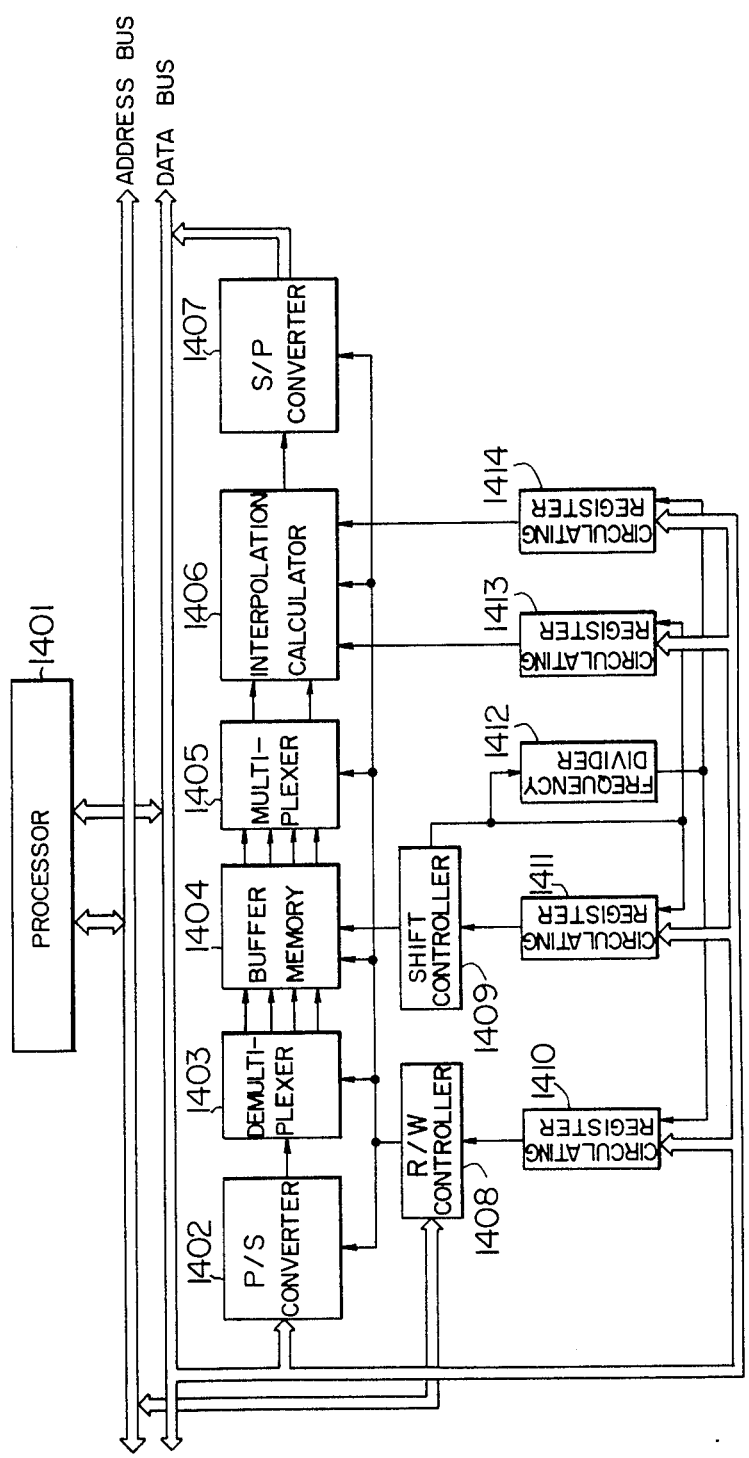

Referring now to FIG. 4 showing an overall construction of an image scale converting apparatus according to one embodiment of the present invention, the apparatus comprises a processor 1401 such as a 16 bit microcomputer, a parallel/serial converter (hereinafter referred to as a P/S converter) 1402 for converting image element data of the original image (hereafter referred to as original image element data) read out of a main memory of the processor 1401 in parallel into serial data, a demultiplexer 1403 for selecting input lines to a line buffer memory 1404 which is a shift register for storing the original image element data on a specified number of rows (for example, four rows) in the unit of rows, a multiplexer 1405 for selecting output lines from the buffer memory 1404, an interpolation calculator 1406 which may be, for example, a ROM and receives data values of image elements near or surrounding an interpolated point (i.e., a converted matrix point) from the multiplexer 1405 and data of vertical and horizontal coordinates $u_m$ and $v_m$ from circulating registers 1413 and 1414 as well and which delivers out a data value representative of the saturation level of an image element of an image subjected to image scale conversion, a serial/parallel converter (hereinafter referred to as S/P converter) 1407 which converts image scale conversion image data delivered out of the interpolation calculator 1406 in series into parallel data and which writes the parallel data into the main memory of the processor 1401, a read/write controller (hereinafter referred to as R/W controller and including, for example, address registers, address calculating ALU and gate circuits) 1408 for controlling data transfer from the processor 1401 to the P/S converter 1402 and data transfer from the S/P converter 1407 to the processor 1401, a shift controller 1409 which receives, from a circulating register 411, shift pulses for determining the number of shiftings to be effected in the buffer memory 1404 and delivers the shift pulses to the buffer memory 1404 and may include, for example, shift pulse counters and gate circuits, and a circulating register 1410 which causes address information in the main memory of the processor 1401 to be delivered sequentially so as to be fetched by the buffer memory 1404 each time one column interpolation is effected. The circulating register 1411 sequentially delivers the shift pulses for determining the number of shiftings in the buffer memory 1404 each time one image element is interpolated. The apparatus further comprises a frequency divider 1412 for counting interpolated image elements for one row, a circulating register 1413 which sequentially delivers a horizontal coordinate $v_n$ of an interpolated point or a converted matrix point within an associated rectangular region in the original matrix to the interpolation calculator 1406 each time one image element interpolation is effected, and a circulating register 1414 which sequentially delivers a vertical coordinate $u_m$ of the interpolated point or the converted matrix point within the associated rectangular region in the original matrix to the interpolation calculator 1406 each time one row of image element interpolation is effected. When making correspondence of FIG. 4 to symbols of FIG. 2, it is noted that $v_n$ corresponds to the output of the circulating register 1413, $u_m$ corresponds to the output of the circulating register 1414, $Y_{n+1} - Y_n = \Delta Y_n$ corresponds to the output of the circulating register 1411, $X_{m+1} - X_m = \Delta X_m$ corresponds to the output of the circulating register 1410, one pulse resulting from a count-up for n corresponds to the inputs to the registers 1411 and 1413, one pulse resulting from a count-up for m corresponds to the inputs to the registers 1410 and 1414, and the data values for $P_{X_{m+1}Y_n}$ and $P_{X_{m+1}Y_{n+1}}$ correspond to outputs of the multiplexer 1405. Especially, the buffer memory 1404 comprises a shift register in order to determine image elements near or surrounding the interpolated point on the basis of $\Delta Y_n$.

The operation of this embodiment will be described with reference to FIG. 5. In step 1501, the processor calculates fundamental cycles for the periodic sequences of data $v_n$, $\Delta Y_n$, $u_m$ and $\Delta X_m$ on the basis of the magnifications for the image scale conversion, i.e., A/a in the row direction and B/b in the column direction (A and B are specific to the apparatus) and loads these fundamental cycles of data on the circulating registers 1410, 1411, 1413 and 1414. In step 1502, coordinates of the leading two rows of the original image are loaded on the buffer memory 1404. In step 1503, coordinates of the subsequent two rows of the original image are calculated on the basis of $\Delta X_m$. In step 1504, the subsequent two rows are loaded on empty lines of the buffer memory 1404 on the basis of the coordinates calculated in the step 1503. In steps 1505 and 1507, contents of the shift register representative of two lines in progress of processing in the buffer memory 1404 is shifted by one bit and two image elements overflowing are fetched into the interpolation calculator 1406. In step 1506, it is judged whether the number of shiftings in the step 1507 reaches the value of $\Delta Y_m$. In steps 1508 and 1509, $v_n$ and $\Delta Y_n$ are respectively subjected to rotate shifting to provide $v_{n+1}$ and $\Delta Y_{n+1}$, respectively. In step 1510, an interpolation calculation is carried out based on $v_n$, $u_m$ and data values representative of the saturation levels for four new image elements overflowing from the buffer memory. In step 1511, it is judged whether the interpolation for one row is finished. In steps 1512 and 1513, $u_m$ and $\Delta X_m$ are respectively subjected to rotate shifting to provide $u_{m+1}$ and $\Delta X_{m+1}$, respectively. In step 1514, it is judged whether the interpolation for one image is finished.

In this embodiment, particular proceedings in the steps in FIG. 5 are carried out in parallel. To this end, parallel processings are carried out for steps 1506 and 1507, step 1508 and step 1509; step 1512 and step 1513; and steps 1503 and 1504 and steps 1505 to 1513. Specifically, the entire processing time for the paths of processing in the steps 1505 to 1513 is equal to the time for shifting a number of image elements of the image subjected to the image scale conversion in the shift register. This means that it takes about 0.6 seconds for obtaining an image scale converted image of A4 size of 8 image elements/mm by means of the shift register of Am 2827 manufactured by Advanced Micro Devices, Inc. On the other hand, the entire processing time for the paths of processing in steps 1503 and 1504 is equal to a product of the number of total bytes in the original and image scale converted images and the transfer speed in the bus. This means that about 1 (one) second is required for obtaining the image scale converted image of A4 size at a transfer speed of 1 M bytes/sec in the bus.

As described above, proceedings in the steps 1305, 1306, 1307 and 1309 in FIG. 3 which disfigure the conventional apparatus are replaced by those in steps 1505 to 1509 in FIG. 5 so that the image scale conversion of the A4 size image requiring about four seconds for its completion with the conventional apparatus can advantageously be carried out in about one second with the apparatus according to the embodiment of the present invention.

The periodicity of the positional relation between the original image matrix and the scale converted image matrix as well as the periodicity of the vertical and horizontal coordinates of a converted matrix point within its associated rectangular region in the original matrix may also be explained as follows according to another aspect of the present invention.

As has already been described with reference to FIG. 2, the image scale conversion is a processing for converting a first image $\{P_{ij}\}$ into a second image $\{Q_{mn}\}$. Some symbols and terms will be further defined herein. An original image element in the original matrix which is coincident with or in close proximity to an image element $Q_{mn}$ in the converted matrix is represented by $P_{X_m Y_n}$ (see FIG. 6). Thus, the image element or a converted matrix point $Q_{mn}$ exists within a rectangular region defined by four points $P_{X_m Y_n}$, $P_{X_m+1 Y_n}$, $P_{X_m Y_n+1}$ and $P_{X_m+1 Y_n+1}$, and this region is termed a reference frame for $Q_{mn}$ and represented by a symbol $C_{mn}$. The vertical and horizontal coordinates of an image element $Q_{mn}$ within its associated reference frame $C_{mn}$ are represented by $u_m$ and $v_n$, respectively. The symbols $(X_m, Y_n)$ and $(u_m, v_n)$ are termed as intermatrix vertical and horizontal coordinates and intramatrix vertical and horizontal coordinates of an image element $Q_{mn}$ at its associated converted matrix point. Further, $$X_m = [\{(m-1) \times a\}/A] + 1 \quad (1)$$

$$Y_n = [\{(n-1) \times b\}/B] + 1 \quad (2)$$

$$u_m = \{(m-1) \times a\}//A \quad (3)$$

$$v_n = \{(n-1) \times b\}//B \quad (4)$$

where symbols "[ ]", "/" and "//" denote Gauss' notation, divisional operation and remainder after division, respectively. And, $\Delta X_m \equiv X_{m+1} - X_m$ and $\Delta Y_n \equiv Y_{n+1} - Y_n$, as already mentioned.

Since, on the other hand, the relation of $a = A/\alpha$ and $b = B/\beta$ stands by letting $\alpha$ and $\beta$ be magnifications in the column direction and row direction, each of the $X_m$, $Y_n$, $u_m$ and $v_n$ can be expressed as a function of the magnifications $\alpha$ and $\beta$ by applying the above relations to equations (1) to (4).

Figure 6:
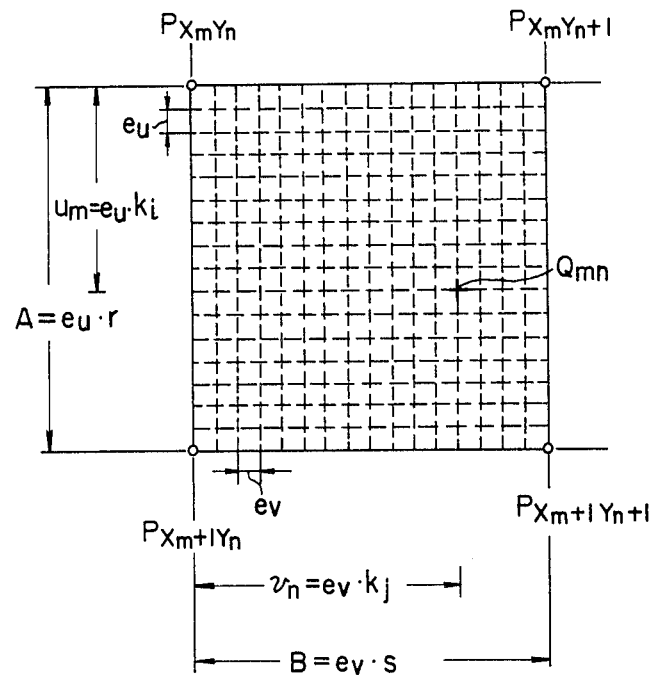
FIG. 6 is an enlarged view of a rectangular region in the original matrix.

Referring now to FIG. 6, each rectangular region in the original matrix, i.e., each reference frame has its column direction side divided by r dividing lines (r being an integer not less than 2) and its row direction side divided by s dividing lines (s being an integer not less than 2), as shown by dotted lines. The integer numbers r and s are column side and row side division factors, respectively. In the second aspect of the present invention, an image element $Q_{mn}$ of the converted image can lie only on an intersection between the longitudinal and lateral dividing lines in a reference frame. In other words, $\alpha$, $\beta$, r should be determined such that the following conditions are met:

$$u_m = (A/r) \times k_i = e_u \cdot k_i \quad (5)$$

$$v_n = (B/s) \times k_j = e_v \cdot k_j \quad (6)$$

$$a = (A/r) \times k_i' = e_u \cdot k_i' \quad (7)$$

$$b = (B/s) \times k_j' = e_v \cdot k_j' \quad (8)$$

where $k_i$, $k_j$, $k_i'$ and $k_j'$ are positive integers. Then, $$u_{m+kr} = u_m \quad (9)$$

$$v_{n+ks} = v_n \quad (10)$$

$$\Delta X_{m+kr} = \Delta X_m \quad (11)$$

$$\Delta Y_{n+ks} = \Delta Y_n \quad (12)$$

are held, where k is an optional integer. That is, $u_m$, $v_n$, $\Delta X_m$ and $\Delta Y_n$ constitute respective periodic sequences of data.

Equations (9) to (12) will be proven hereunder.

Proof of Equations (9) and (10)

From equations (3) and (7), $$\begin{aligned} u_{m+kr} &= (u_m + k \times r \times a)//A \\ &= (u_m + A \times <\text{integer}>)//A \\ &= u_m \end{aligned}$$

Similarly, it can be proved that $v_{n+ks} = v_n$.

Proof of Equations (11) and (12)

The spacing between the first row of the original matrix and the (m+kr+1)th row of the converted matrix will be $$A \cdot X_{m+kr+1} + u_{m+kr+1} = A \cdot X_{m+kr} + u_{m+kr} + a$$

$$\therefore A \cdot (X_{m+kr+1} - X_{m+kr}) = a - (u_{m+kr+1} - u_{m+kr}).$$

On the other hand, from equation (9)

$$u_{m+kr+1} = u_{m+1} \text{ and } u_{m+kr} = u_m$$

From the above definition, $$X_{m+kr+1} - X_{m+kr} = \Delta X_{m+kr}$$

$$\therefore A \times \Delta X_{m+kr} = a - (u_{m+1} - u_m) \quad (13)$$

On the other hand, the spacing between the first row of the original matrix and the (m+1)th row of the converted matrix will be $$A \cdot X_{m+1} + u_{m+1} = A \cdot X_m + u_m + a$$

$$\therefore A \cdot (X_{m+1} - X_m) = a - (u_{m+1} - u_m)$$

so that, $$A \cdot \Delta X_m = a - (u_{m+1} - u_m) \quad (14)$$

From equations (13) and (14), $$\Delta X_{m+kr} = \Delta X_m$$

can be obtained. Similarly, it can be proved that $\Delta Y_{n+ks} = \Delta Y_n$.

Figure 7:
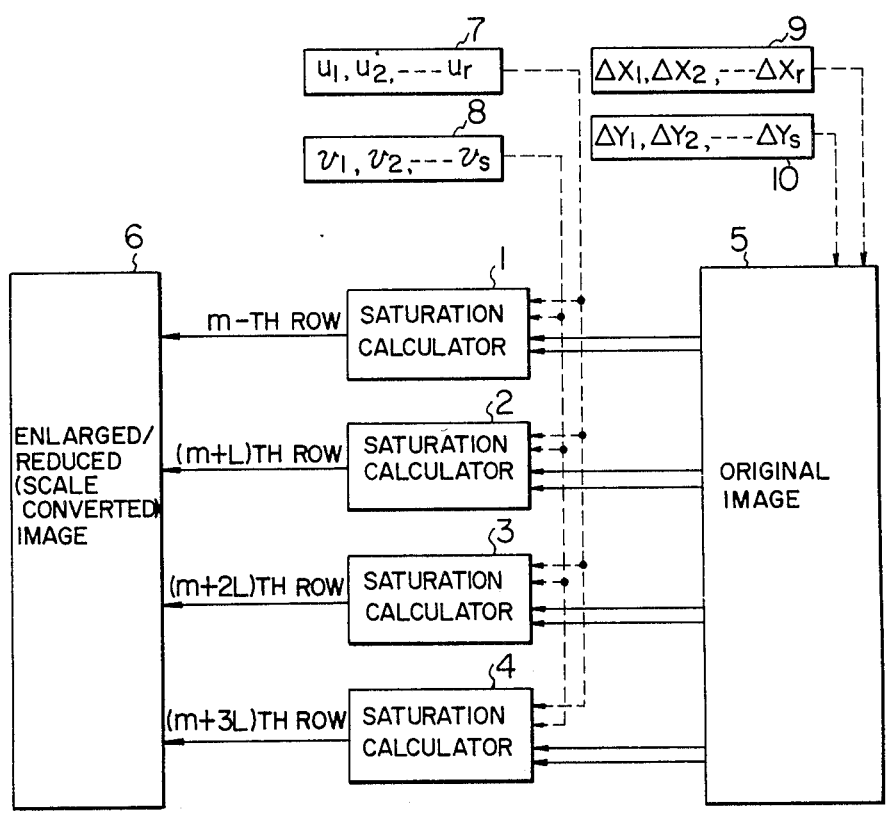

Equations (9) to (12) as above show that $u_m$, $v_n$, $\Delta X_m$ and $\Delta Y_n$ have periodicity. Specifically, $u_m$ and $\Delta X_m$ are cyclic with a period of r or r divided by a positive integer and $v_n$ and $\Delta Y_n$ are cyclic with a period of s or s divided by a positive integer. In the second aspect of the present invention use is made of the periodicity purposely to raise the speed of the image scale conversion processing in the following manner, as shown in FIG. 7.

(1) Since data $u_m$, $v_n$, $\Delta X_m$, and $\Delta Y_n$ have periodicity, their periodical sequences data, namely, calculated values of $\{u_1, u_2, \ldots, u_r\}$, $\{v_1, v_2, \ldots, v_s\}$, $\{\Delta X_1, \Delta X_2, \ldots, \Delta X_r\}$, and $\{\Delta Y_1, \Delta Y_2, \ldots, \Delta Y_s\}$ *are stored in tables 7–10 and referred to repetitively. Thus, there is no need to effect the coordinate calculation for all the image elements in contrast to the conventional apparatus but the same number of values for* $u_m$ *and* $\Delta X_m$ *as r and the same number of values for* $v_n$ *and* $\Delta Y_n$ *as s* (for example r = s = 16) are calculated at the start of the image scale conversion processing and in the subsequent processing, results of the calculation can simply be referred to, thereby simplifying the method of and the apparatus for the scale conversion and making it possible to raise the processing speed.

(2) Saturation calculation is performed symultaneously for image elements of the converted image on m-th row, $\{Q_{m1}, Q_{m2}, Q_{m3}, \ldots\}$, for image elements of the converted image on (m+L)th row, $\{Q_{m+L1}, Q_{m+L2}, Q_{m+L3}, \ldots\}$, for image elements of the converted image on (m+2L)th row $\{Q_{m+2L1}, Q_{m+2L2}, Q_{m+2L3}, \ldots\}, \ldots$, i.e., for image elements of the converted image on those rows which are spaced by k.L rows vertically from m-th row (k being a positive integer). This is parallel processing for the image scale conversion. The spacing L is a constant which is an integer multiple of r. As will be seen from equations (9) to (12), the individual converted image elements vertically spaced apart from each other at the spacing L have the same intra-matrix coordinates (vertical and horizontal coordinates) and the same difference in column (row) number between two corresponding image elements in the two adjacent reference frames in the row (column) direction. Accordingly, accessing of the original image element data to saturation calculating units can be controlled in common.

The operational principle for the processing generally described hereinbefore will be explained with reference to FIG. 7. Illustrated in FIG. 7 are saturation calculators 1 to 4 which are adapted to process in parallel the individual image elements spaced apart from each other vertically at the spacing L, where L is a constant which is an integer multiple of r (L=kr). The number of the saturation calculators can be selected to conform to a desired degree of parallel processing, with one example being four as shown in FIG. 7. The image data values as a result of image scale conversion are sequentially delivered out of each of the saturation calculators 1, 2, 3 and 4 in the order as shown in FIG. 8. Thus, in FIG. 7, original image element data 5 are converted into scale-converted image element data 6. As well known in the art, data necessary for calculating data representative of the saturation level of a point $Q_{mn}$ in the converted matrix are saturation levels of four original image elements $P_{X_mY_n}$, $P_{X_{m+1}Y_n}$, $P_{X_mY_{n+1}}$ and $P_{X_{m+1}Y_{n+1}}$ which define a reference frame $C_{mn}$ for the original matrix point $Q_{mn}$, and intra-matrix coordinates $(u_m, v_n)$ of the converted matrix point $Q_{mn}$ within the reference frame $C_{mn}$. The manner of calculating the saturation for the matrix point $A_{mn}$ on the basis of the data as above involves known logical sum method, logical product/sum method, nearest neighbour method and projection method (for example, Preliminary Transactions for Image Engineering Conference, pp. 71 to 74, December 1981) and will not be detailed herein. Of the data necessary for calculating the saturation, the intra-matrix coordinates are obtained by referring to tables 7 and 8 as shown in FIG. 7. Specifically, data values of the fundamental cycles for the intra-matrix coordinates $\{u_1, u_2, \ldots, u_r\}$ and $\{v_1, v_2, \ldots, v_s\}$ are stored in the tables 7 and 8, respectively. Data values of the fundamental cycles for the differences in the column number and in the row number of corresponding matrix points in the adjacent reference frames, i.e., $\{\Delta X_1, \Delta X_2, \ldots, \Delta X_r\}$ and $\{\Delta Y_1, \Delta Y_2, \ldots, \Delta Y_s\}$ are stored in tables 9 and 10, respectively. Data values for the four original image elements $P_{X_mY_n}$, $P_{X_{m+1}Y_n}$, $P_{X_mY_{n+1}}$ and $P_{X_{m+1}Y_{n+1}}$ in the original matrix necessary for calculating the saturation for the converted matrix point $Q_{mn}$ are read out of the original image 5 by making reference to the contents of the tables 9 and 10 and fed to the saturation calculators 1 to 4. The saturation calculator 1 calculates data representative of the saturation levels for converted matrix points $Q_{m1}, Q_{m2}, Q_{m3}, \ldots$ on the m-th row (m = 1, 2, 3 . . . ), and original image element data for this purpose exist on $X_m$-th and $(X_{m+1})$-th rows of the original image. Similarly, other saturation calculators 2 to 4 are supplied with data for two rows from the original image. As shown in FIG. 8, accessing the original image data 5 and execution controlling for the saturation calculators 1 to 4 are carried out by referencing the tables 7 to 10 whose contents have been calculated and stored at the start of the image scale conversion processing. In the subsequent processing procedure the calculation results are referenced repetitively. Data values $\{u_1, u_2, \ldots, u_r\}$, $\{v_1, v_2, \ldots, v_s\}$, $\{\Delta X_1, \Delta X_2, \ldots, \Delta X_r\}$ and $\{\Delta Y_1, \Delta Y_2, \ldots, \Delta Y_s\}$ are calculated pursuant to equations (1) to (4) on the assumption that the magnifications for the image scale conversion ($\alpha$ times in the column direction and $\beta$ times in the row direction) are given and known.

As described previously, it is established that the converted matrix point $Q_{mn}$ comes into existence only on intersections of r x s dividing lines on the rectangular region in the original matrix. This establishment may limit the magnifications for the image scale conversion in one sense. By letting the magnifications in the vertical direction be $\alpha$, a = A/$\alpha$ is held. On the other hand, the above establishment causes such a requirement that $a = (A/r) \cdot k_i' = u_r \cdot k_i'$ must be satisfied. From these equations, $\alpha = r/k_i'$ is introduced ($r \geq 2$, $k_i' \geq 1$). Thus, the magnification $\alpha$ is not continuous but is allowed to have discrete values which satisfy the last mentioned equation. For r=16, for example, an allowable value of the magnification $\alpha$ is limited to any one of 16, 8, . . . , 2.0, 1.78, 1.60, 1.45, 1.33, 1.23, 1.14, 1.07, 1.0, 0.94, 0.89, 0.84, 0.80, 0.76 . . . . The requirement for the magnficiation will be put aside practically by setting the column side division factor r appropriately. The magnification $\beta$ in the row direction can be treated similarly.

Assuming that r=16, $\alpha = r/k_i' = 16/20 = 0.8$, values of $u_m$, $X_m$ and $\Delta X_m$ can be calculated from equations (1) and (3) in consideration of a=A/$\alpha$ and $\Delta X_m = X_{m+1} - X_m$ to provide results as shown in Table 1. As will be told from Table 1, each of the $\Delta X_m$ and $u_m$ is a periodic function (period $\leq$ r) of m. Values of $v_n$, $Y_n$ and $\Delta Y_n$ can be calculated similarly but they will not be exemplified herein.

TABLE 1

| m | $X_m$ | $\Delta X_m$ | $u_m$ |
|---|---|---|---|
| 1 | 1 | 1 | 0 |
| 2 | 2 | 1 | $(\frac{1}{4})$ A |
| 3 | 3 | 1 | $(\frac{1}{2})$ A |
| 4 | 4 | 2 | $(\frac{3}{4})$ A |
| 5 | 6 | 1 | 0 |
| 6 | 7 | 1 | $(\frac{1}{4})$ A |
| 7 | 8 | 1 | $(\frac{1}{2})$ A |
| 8 | 9 | 2 | $(\frac{3}{4})$ A |
| 9 | 11 | 1 | 0 |
| 10 | 12 | 1 | $(\frac{1}{4})$ A |
| 11 | 13 | 1 | $(\frac{1}{2})$ A |
| 12 | 14 | 2 | $(\frac{3}{4})$ A |
| 13 | 16 | 1 | 0 |
| 14 | 17 | 1 | $(\frac{1}{4})$ A |
| 15 | 18 | 1 | $(\frac{1}{2})$ A |
| 16 | 19 | 2 | $(\frac{3}{4})$ A |
| . | . | . | . |
| . | . | . | . |
| . | . | . | . |

Figure 9:
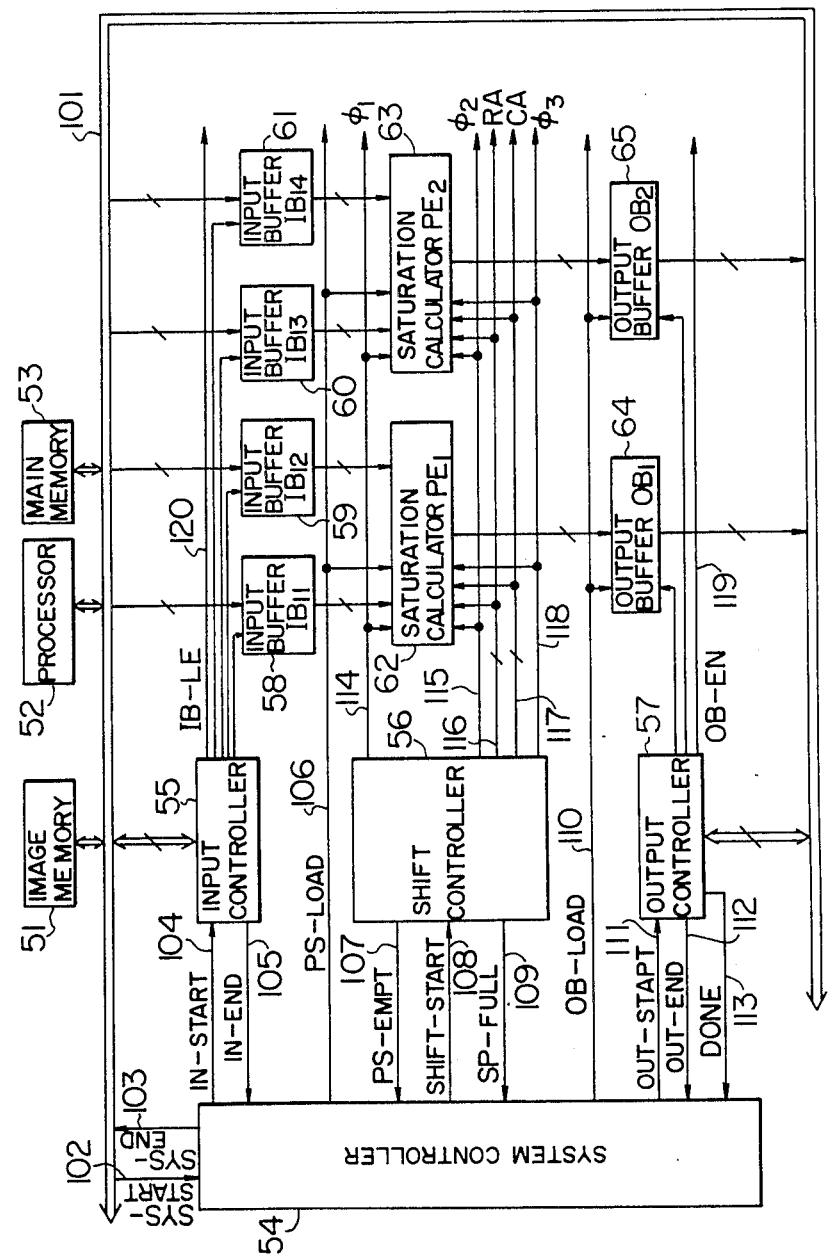
FIG. 9 is a block diagram of another embodiment of the present invention.

Another embodiment of the present invention will now be described. FIG. 9 shows the overall structure of an image scale converting apparatus.

Illustrated in FIG. 9 are an image memory 51, a processor 52 such as a 16-bit microprocessor e.g., microprocessor 8086 manufactured by Intel), a main memory 53 for storing therein programs for the processor 52, column and row division constant r and s and others, a system controller 54, an input controller 55, a shift controller 56, an output controller 57, input buffers 58 to 61 as designated by $IB_{11}$, $IB_{12}$, $IB_{13}$ and $IB_{14}$, respectively, saturation calculators processing elements 62 and 63 as designated by $PE_1$ and $PE_2$, respectively, and output buffers 64 and 65 as designated by $OB_1$ and $OB_2$, respectively. Principal signal lines in FIG. 9 are a common bus 101, a system start (SYS-START) signal line 102, a system end signal (SYS-END) line 103, a data input start signal (IN-START) line 104, a data input end signal (IN-END) line 105, a load signal (PS-LOAD) line 106 connected to parallel/serial (PS) registers included in the processing elements, a signal (PS-EMPT) line 107 for transmission of PS-EMPT representative of data empty in the PS registers included in the processing elements, a start signal (SHIFT-START) line 108 connected to the shift controller 56, a signal (SP-FULL) line 109 for transmission of SP-FULL representative of full data conditions in serial/parallel (SP) registers included in the processing elements, a load signal (OB-LOAD) line 110 connected to the output buffers 64 and 65, a data output start signal (OUT-START) line 111, a data output end signal (OUT-END) line 112, a data processing end signal (DONE) line 113, a line 114 for transmission of a clock $\phi_1$, a line 115 for transmission of clock $\phi_2$, a line 116 for transmission of vertical coordinate (RA) of intra-matrix coordinates, a line 117 for transmission of horizontal coordinate (CA) of the intra-matrix coordinates, a line 118 for transmission of a clock $\phi_3$, an output buffer enable signal (OB-EN) line 119 connected to the output buffers 64 and 65, and an input buffer load enable signal (IB-EN) line 120 connected to the input buffers 58 to 61. In the following description, signals are denoted by reference numerals representative of corresponding signal lines.

In operation, original image data values stored in the image memory 51 are sent to the saturation calculators or processing elements 62 and 63 via the input buffers 58 to 61, and the image data are subjected to an image scale conversion and the resulting scale-converted image element data are transferred to the image memory 51 via the output buffers 64 and 65. In this processing, the data transfer from the image memory 51 to the input buffers 58 to 61 is controlled by input controller 55, and the saturation calculators (processing elements) 62 and 63 are controlled by the shift controller 56. The transfer of the converted image element data as a result of the image scale conversion from the saturation calculators (processing elements) 62 and 63 to the image memory 51 via the output buffers 64 and 65 is controlled by the output controller 57. The system controller 54 manages or supervises the input controller 55, shift controller 56 and output controller 57. The saturation calculators 62 and 63 operate in parallel. In FIG. 9, two saturation calculators or processing elements are provided for simplicity of explanation but generally, the number of processing elements is determined in accordance with the degree of parallel processing desired. It is needless to say that a single saturation calculator may be provided.

Figure 10A:
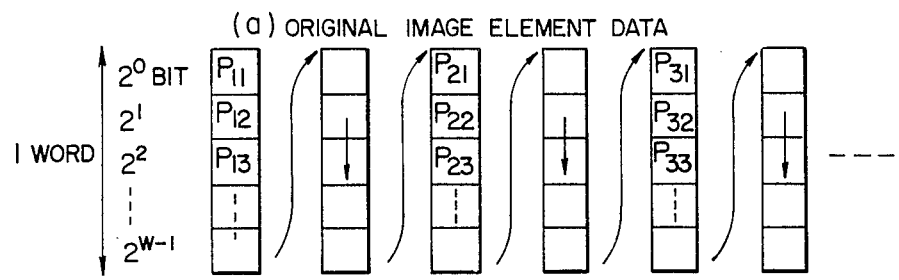
Figure 10B:
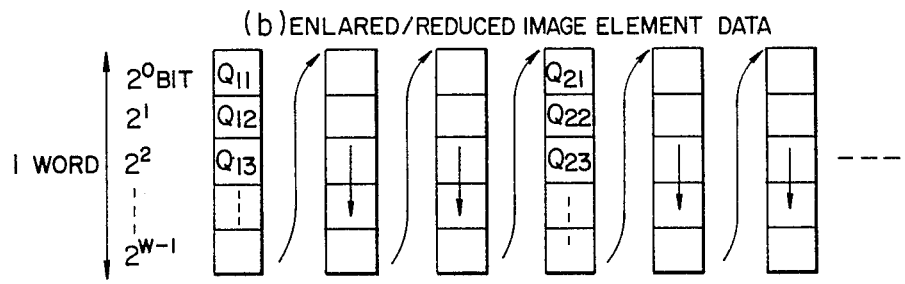

As shown in FIGS. 10A and 10B, the data for image elements (original image elements and scale-converted image elements) are stored in the unit of words each consisting of W bits in the image memory 51. Data representative of a leading image element in each row, i.e., $P_{il}$ or $Q_{ml}$ is stored at $2^0$ bit of the image memory, where i=1, 2, 3, ... and m=1, 2, 3, ... The data transfer from the image memory 51 to the input buffers 58 to 61, that from the input buffers 58 to 61 to the saturation calculators 62 and 63, that from the saturation calculators 62 and 63 to the output buffers 64 and 65, and that from the output buffers 64 and 65 to the image memory 51 are all effected in the unit of words. Therefore, the input buffers 58 to 61 and output buffers 64 and 65 have each a capacity of one word of W bits. One word may consist of 8 bits or 16 bits, for example.

Figure 11:
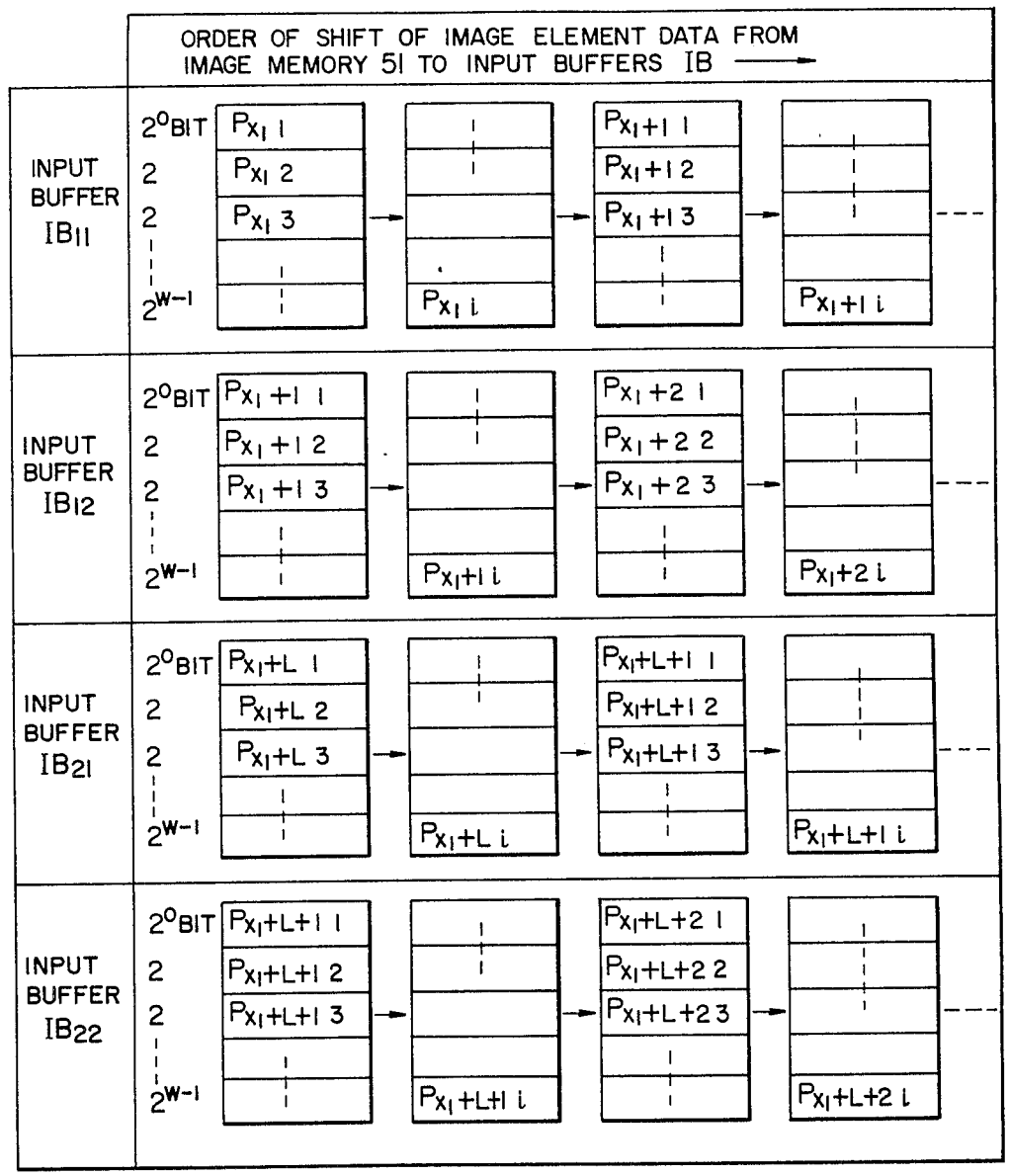
FIG. 11 illustrates transfer of data from the image memory to the input buffer shown in FIG. 9.

In the saturation calculator 62, the calculation is carried out in the order of $Q_{11}$, $Q_{12}$, $Q_{13}$, ..., $Q_{21}$, $Q_{22}$, $Q_{23}$, ..., $Q_{31}$, $Q_{32}$, $Q_{33}$, ... as shown in FIG. 8. In parallel therewith, the calculation proceeds, in the saturation calculator 63, in the order of $Q_{1+L1}$, $Q_{1+L2}$, $Q_{1+L3}$, ..., $Q_{2+L1}$, $Q_{2+L2}$, $Q_{2+L3}$, ..., $Q_{3+L1}$, $Q_{3+L2}$, $Q_{3+L3}$, ... For saturation calculation of a desired image element $Q_{mn}$ of the converted image, data values representative of the saturation levels for four original image elements $P_{X_mY_n}$, $P_{X_m+1Y_n}$, $P_{X_mY_n+1}$ and $P_{X_m30\ 1Y_n+1}$ are required. These four points are present on the $X_m$-th row and the $(X_m+1)$-th row of the original image matrix. In the arrangement of FIG. 9, the input buffers 58 and 59 fetch from the image memory 51 data values of the original image elements in respect of the $X_m$-th row and the $(X_m+1)$-th row, respectively, so as to supply the data to the saturation calculator 62. Similarly, the input buffers 60 and 61 fetch from the image memory 51 data values of the original image elements in respect of the $(X_m+1)$-th row and the $(X_m+L+1)$-th row, respectively, so as to supply the data to the saturation calculator 63. The input buffers 58 to 61 have each a capacity of one word of W bits and read the original image element data in the order as shown in FIG. 11.

Figure 12:
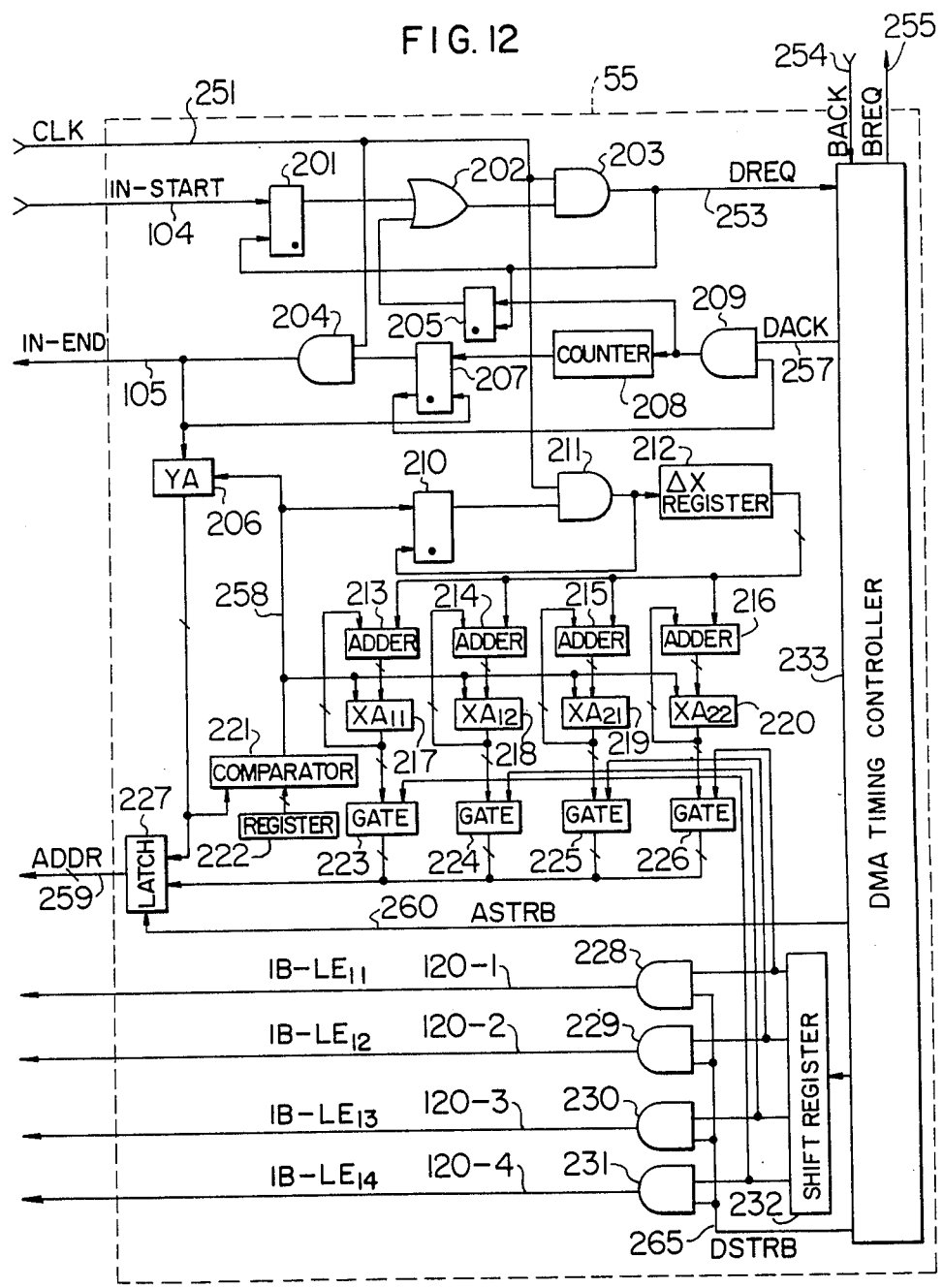
FIGS. 12–15 and 17 show examples of the structure of the main portions of the embodiment shown in FIG. 9.

The input controller 55 functions to control the transfer of the original image element data from the image memory 51 to the input buffers 58 to 61 and has a construction as shown in FIG. 12. The input controller 55 is started by a data input start signal (IN-START) 104 fed from the system controller 54 and it reads the original image element data from the image memory 51 word by word, sequentially writes the data into the input buffers 58 to 61 and thereafter sends a data input end signal (IN-END) 105 to the system controller 54. Namely, the IN-START signal 104 sets a flip-flop circuit (FF) 201. In the figure, mark "·" designates initial states of flip-flop circuits. An output signal of the FF 201 is sent to an AND gate 203 via an OR gate 202, and a data transfer request signal (DREQ) 253 is sent to a direct memory access (DMA) timing controller 233 in synchronism with timings of a fundamental clock signal (CLK) 251. The DREQ 253 also resets the FF 201 and a FF 205. The DMA timing controller 233 controls the bus request in the direct memory accessing. The operational principle of the controller 233 is well known in the art and will not be described herein. When receiving the DREQ 253, the DMA timing controller 233 issues a bus request signal (BREQ) 255 to the processor 52. The DMA timing controller 233 then receives from the processor 52 a confirmation signal (BACK) 254 responsive to the BREQ 255 and issues a data transfer confirmation signal (DACK) 257. The FF 205 is again reset by the DACK 257 sent via an AND gate 209 so that a DREQ 253 is again issued though a route of the OR gate 202 and AND gate 203. A counter 208 is adapted to count the number of issuance of the DREQ 253. When the issue number coincides with the number of the input buffers 58 to 61 (four in this embodiment), the output of the counter 208 sets a FF 207 to enable the AND gate 209. As a result, an IN-END 105 is produced from an AND gate 204 in synchronism with the CLK 251. The IN-END 105 resets the FF 207. In this manner, upon receipt of the IN-START 104, the input controller 55 repeats the issuance of the DREQ 253 which coincides in number with the input buffers 58 to 61. At this time, an address of image element data read out of the image memory 51 is represented by an ADDR 259. The address of the image memory 51 is a two-dimensional address consisting of Y addresses (column addresses) and X addresses (row addresses). Contents of a Y address register 206 are used as a Y address and contents of X address registers 217 to 220 are selected by gates 223 to 226 to provide an X address. The X and Y addresses are latched in a latch 227 in response to an address strobe signal (ASTRB) 260 to control delivery of the ADDR 259. As has already been described with reference to FIG. 11, the original image element data supplied to the input buffers 58 to 61 begin with data on the $X_1$-th row, $(X_1+1)$-th row, $(X_{1+L})$-th row and $(X_1+L+1)$-th row, respectively. Correspondingly, the X address registers 217 to 220 are set in advance with initial values representative of row numbers $X_1, X_1+1, X_1+L$ and $X_1+L+1$. The Y address register 206 is initialized to zero. As described previously, upon receipt of the IN-START 104 from the system controller 54, the input controller 55 repeats the issuance of the DREQ 253 which coincides in number with the input buffers 58 to 61. With an initial DREQ 253 issued, the contents of the X address register 217 ($XA_{11}$) is sent to the latch 227 via the gate 223. Subsequently, the contents of the X address register 218 ($XA_{12}$), the contents of the X address register 219 ($XA_{21}$) and the contents of the X address register 220 ($XA_{22}$) are sequentially sent to the latch 227 in response to second, third and fourth issuances of the DREQ 253. Thus, a shift register 232 is adapted to produce gate control signals which control the gates 223 to 226 so that the X address registers 217 to 220 are sequentially selected in a manner described above. The gate control signals from the shift register 232 also control AND gates 228 to 231, and load enable signals (IB-LE$_{11}$ to IB-LE$_{22}$) 120-1 to 120-4 are sequentially sent to the input buffers 58 to 61 in synchronism with a data strobe signal (DSTRB) 265. Consequently, each of the input buffers 58 to 61 is stored with the original image data read out of the image memory 51 one word by one word in sequence as shown in Table 2.

TABLE 2

| Order of issuance of DREQ/DACK | 1 | 2 | 3 | 4 |
| --- | --- | --- | --- | --- |
| Selected X address register | $XA_{11}$ | $XA_{12}$ | $XA_{21}$ | $XA_{22}$ |
| Selected input buffer | $IB_{11}$ | $IB_{12}$ | $IB_{21}$ | $IB_{22}$ |

The contents of the Y address register 206 is incremented by +1 each time the IN-END 105 is issued when the data transfer to each of the input buffers 58 to 61 ends. A register 222 is adapted to store the row length (the length of one row) of the original image in terms of words. A comparator 221 is adapted to compare the contents of the Y address register 206 and the register 222. Upon coincidence, a coincidence signal 258 is produced from the comparator 221 to reset the Y address register 206. Concurrently, the contents of each of the X address registers 217 to 220 is added with a value read out of a ΔX register 212 and a resultant sum is set to each of the X address registers 217 to 220. The ΔX register 212 is thus a circulating register for storing the fundamental cycle for the periodic sequences of data being representative of differences between a row number $X_m$ of one original matrix point in the reference frame $C_{mn}$ for a converted matrix point $Q_{mn}$ and a row number $X_{m+1}$ of one original matrix point in the reference frame $C_{m+1n}$ for a converted matrix point $Q_{m+1n}$, $\{\Delta X_1, \Delta X_2, \ldots \Delta X_r\}$. Initially, the ΔX register 212 stores the difference in an orderly manner of $\{\Delta X_1, \Delta X_2, \ldots, \Delta X_r\}$ and the heading data $\Delta X_1$ is sent to adders 213 to 216. The coincidence signal 258 updates the contents of the X address registers 217 to 220 and at the same time sets a FF 210. When the FF 210 is set, a shift pulse is sent to the register 212 via an AND gate 211 so that the contents of the register 212 changes to $\{\Delta X_2, \Delta X_3, \ldots, \Delta X_r, \Delta X_1\}$. Subsequently, each time the comparator 221 detects coincidence of the contents of the Y address register 206 with the contents of the register 222, the contents of the register 212 are shifted sequentially and circulatively. The input controller 55 operates in a manner described thus far.

Figure 13:
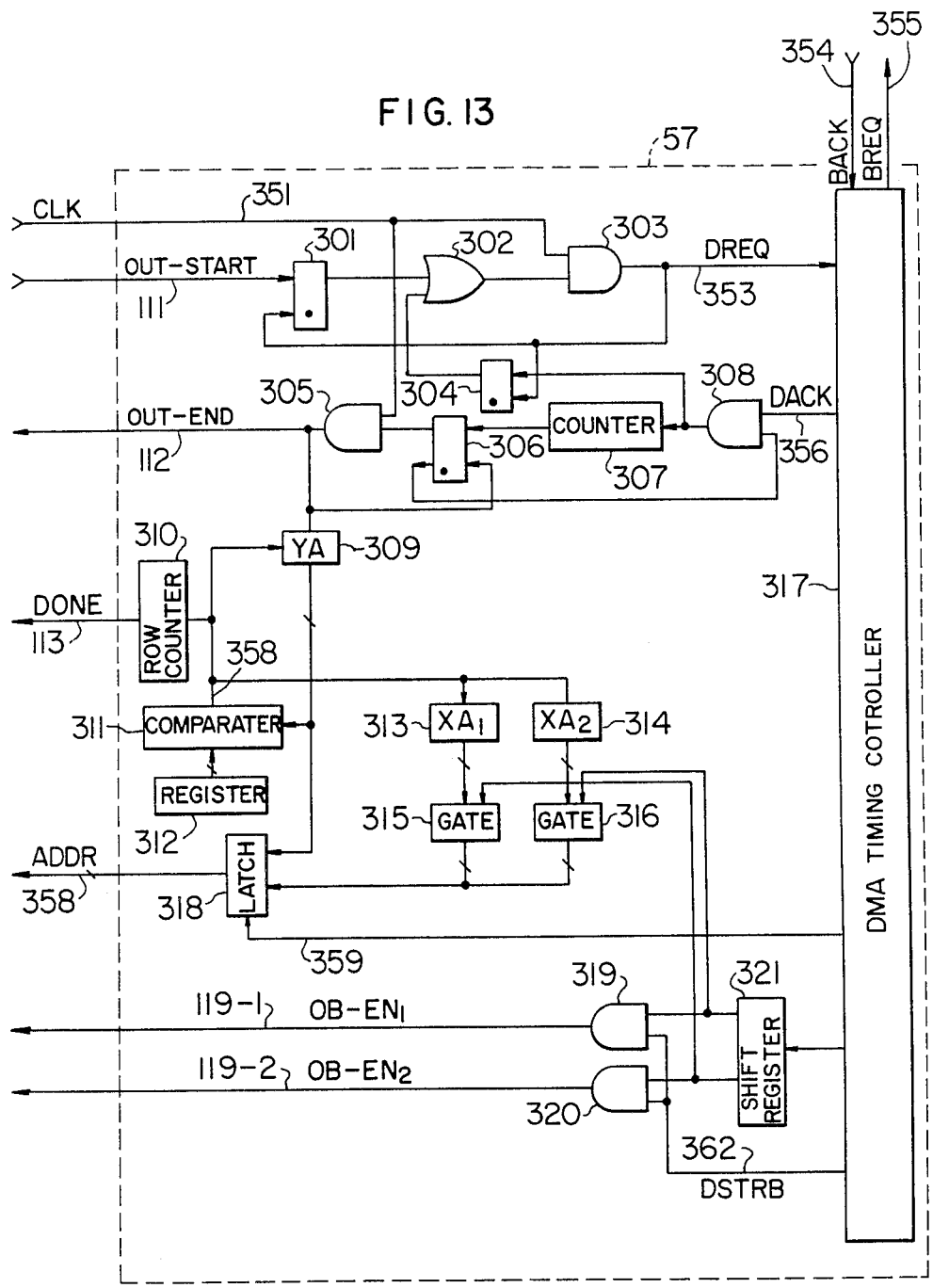

The output controller 57 functions to control the transfer of the image element data subjected to image scale conversion from the output buffers 64 and 65 to the image memory 51, and has a construction as shown in FIG. 13. The output controller 57 is started by a data output start signal (OUT-START) 111 fed from the system controller 54. When the data transfer from the output buffers 64 and 65 to the image memory 51 ends, the output controller 57 sends a data output end signal (OUT-END) 112 to the system controller 54. The received OUT-START 111 sets a FF 301. An output of the FF 301 is sent to an AND gate 303 via an OR gate 302, and a data transfer request signal (DREQ) 353 is sent to a DMA timing controller 317 in synchronism with timings of a fundamental clock signal (CLK) 351. The DREQ 353 also resets the FF 301 and a FF 304. When receiving the DREQ 353, the DMA timing controller 317 issues a bus request signal (BREQ) 355 to the processor 52. The DMA timing controller 317 then receives from the processor 52 a confirmation signal (BACK) 354 responsive to the BREQ 355 and issues a data transfer confirmation signal (DACK) 356. The FF 304 is again set by the DACK 356 fed via an AND gate 308 so that a DREQ 353 is again issued through a route of the OR gate 302 and AND gate 303. A counter 307 is adapted to count the number of issuance of the DREQ 353. When the issue number coincides with the number of the output buffers 64 and 65 (two in this embodiment), the output of the counter 307 sets a FF 306 to enable the AND gate 308. As a result, an OUT-END 112 is produced from an AND gate 305 in synchronism with the CLK 351. The OUT-END 112 resets the FF 306. In this manner upon receipt of the OUT-START 111, the output controller 57 repeats the issuance of the DREQ 353 which coincides in number with the output buffers 64 and 65. At this time, an address for writing the image memory 51 is represented by an ADDR 358. The address of the image memory 51 consists of Y addresses (column addresses) and X addresses (row addresses). Contents of a Y address register 309 is used as a Y address and contents of X address registers 313 and 314 are selected by gates 315 and 316 to provide an X address. The X and Y addresses are latched in a latch 318 in response to an address stroke signal (ASTRB) 359 to control delivery of the ADDR 358. The image element data subject to image scale conversion is stored in the image memory 51 as described with reference to FIG. 10B. Initial values corresponding to the storage in the image memory are set in advance in the X address registers 313 and 314. The Y address register 309 is initialized to a heading address for storage of the image element data subject to image scale conversion. Upon receipt of the OUT-START 111, the output controller 57 repeats the issuance of the DREQ 353 which coincided in number with the output buffers 64 and 65. With an initial DREQ 353 issued, the contents of the X address register 313 (XA$_1$) is sent to the latch 318 via the gate 315. With a second DREQ 353 issued, the contents of the X address register 314 (XA$_2$) is sent to the latch 318 via the gate 316. Thus, a shift register 321 is adapted to produce gate control signals which control the gates 315 and 316 so that the X address registers 313 and 314 are sequentially selected in a manner described above. The gate control signals also control AND gates 319 and 320, and output enable signals (OB-EN$_1$ and OB-EN$_2$) 119-1 and 119-2 are sequentially sent to the output buffers 64 and 65 in synchronism with a data strobe signal (DSTRB) 362. Consequently, the data read out of each of the output buffers 64 and 65 is stored in the image memory 51 one word by one word. The contents of the Y address register 309 is incremented by +1 each time the OUT-END 112 is issued when the data transfer from each of the output buffers 64 and 65 to the image memory 51 ends. A register 312 is adapted to store the row length (the length of one row) of the scale-converted image conversion in terms of words. A comparator 311 is adapted to compare the contents of the Y address register 309 and the register 312. Upon coincidence, a coincidence signal 358' is produced from the comparator 311 to increment the contents of the X address registers 313 and 314 by +1 and to decrement the contents of a row counter 310 by −1. The row counter 310 is initialized to the number of rows in the image subject to image scale conversion. When the contents of the row counter 310 reaches zero, indicating that the image scale conversion processing comes to an end, a data process end signal (DONE) 113 is sent to the system controller 54. The operational principle of the output controller 57 has been described thus far.

Figure 14:
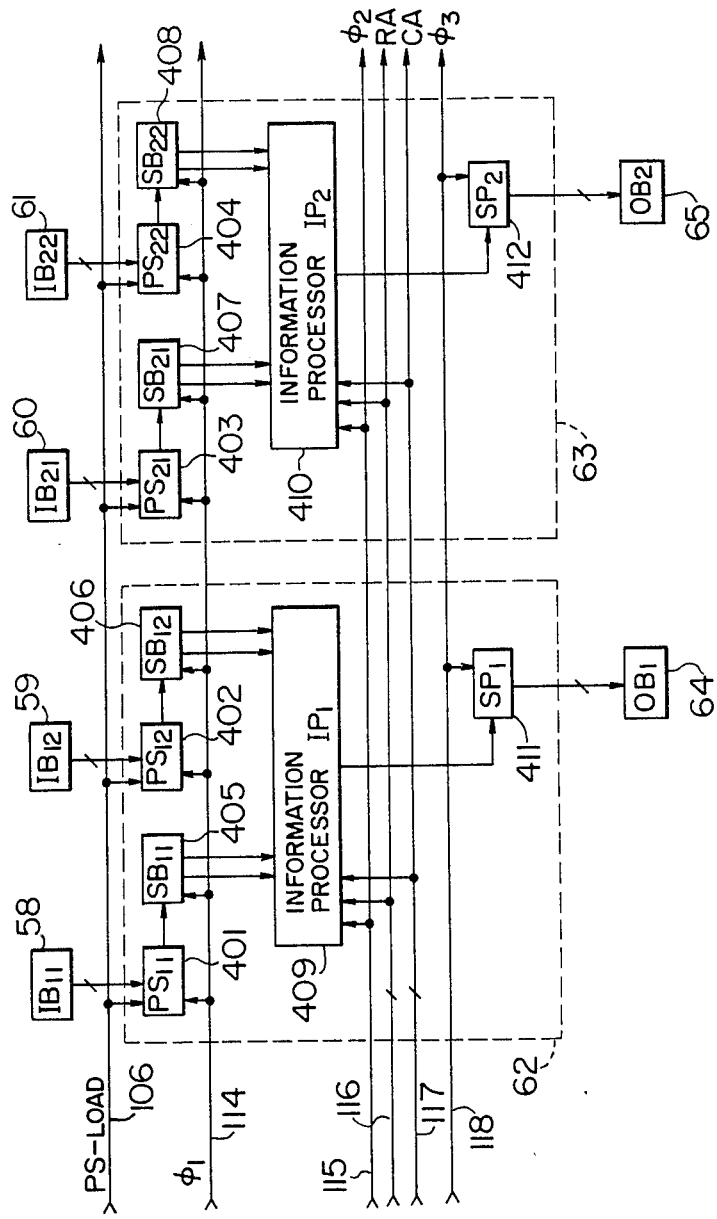

Turning now to FIG. 14, construction and operation of the saturation calculators (processing elements) 62 and 63 will be described. The saturation calculators 62 and 63 have the same construction and the following description will be given of the calculator 62 alone. The saturation calculator 62 functions to convert the image scale of the original image element data stored in the input buffers 58 and 59 and to store the data subject to the image scale conversion in an SP register (SP$_1$) 411. When receiving a PS-LOAD signal 106 from the system controller 54, the saturation calculator 62 loads the contents of the input buffers 58 and 59 on PS registers (PS$_{11}$ and PS$_{12}$) 401 and 402, respectively. The PS$_{11}$ 401 and PS$_{12}$ 402 are parallel/serial conversion shift registers which sequentially shift their contents in response to a clock signal $\phi_1$ 114 fed from the shift controller 56 and deliver the contents to serial buffers (SB$_{11}$ and SB$_{12}$) 405 and 406, respectively. The SB$_{11}$ 405 and SB$_{12}$ 406 are shift registers which store image element data for two image elements and accordingly for four adjacent image elements in total. Assuming now that at a certain time, an image element $Q_{mn}$ undergoes saturation calculation by an information processor (IP$_1$) 409, the shift controller 56 sends repeatedly a signal $\phi_1$ 114 by a frequency which is required for loading four image elements of a reference frame $C_{mn}$ for the $Q_{mn}$ (namely, $P_{X_m Y_n}$, $P_{X_m+1 Y_n}$, $P_{X_m+1 Y_n}$, $P_{X_m Y_n+1}$ and $P_{X_m+1 Y_n+1}$) on the SB$_{11}$ 405 and SB$_{12}$ 406, as will be described later. When the four image elements in the SB$_{11}$ and SB$_{12}$ coincide with the reference frame for the $Q_{mn}$, the shift controller 56 starts to send a clock signal $\phi_2$ 115 to the image processor 409. Concurrently, the shift controller 56 also sends a vertical coordinate $u_m$ (RA) 116 and a horizontal coordinate $v_m$ (CA) 117 representative of the intra-matrix coordinates of the $Q_{mn}$. The information processor 409 utilizes data of the RA 116, CA 117, SB$_{11}$ 405 and SB$_{12}$ 406 to calculate the saturation. The manner of calculating the saturation involves known logical sum method, logical product/sum method and projection method (for example, Preliminary Transactions for Image Enginnering Conference, pp. 71 to 74, December 1981). The present invention is not concerned with an algorithm of the saturation calculation and the construction of the information processor 409 will not be described herein. Results of the saturation calculation for the $Q_{mn}$ are sent from the information processor 409 at the timing of a clock signal $\phi_3$ 118 to the SP$_1$ 411 for storage therein. The SP$_1$ 411 stores saturation calculation results for W image elements in an orderly manner without empty.

Figure 16:
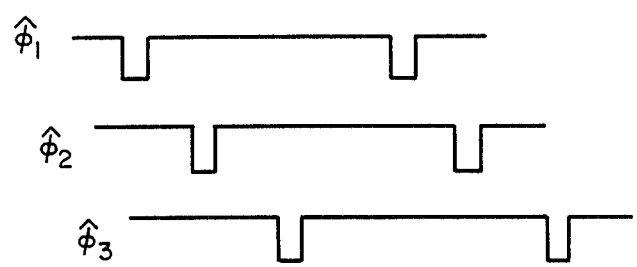
FIG. 16 is a waveform diagram illustrating clock pulse signals used for shifting original image element data.
Figure 15:
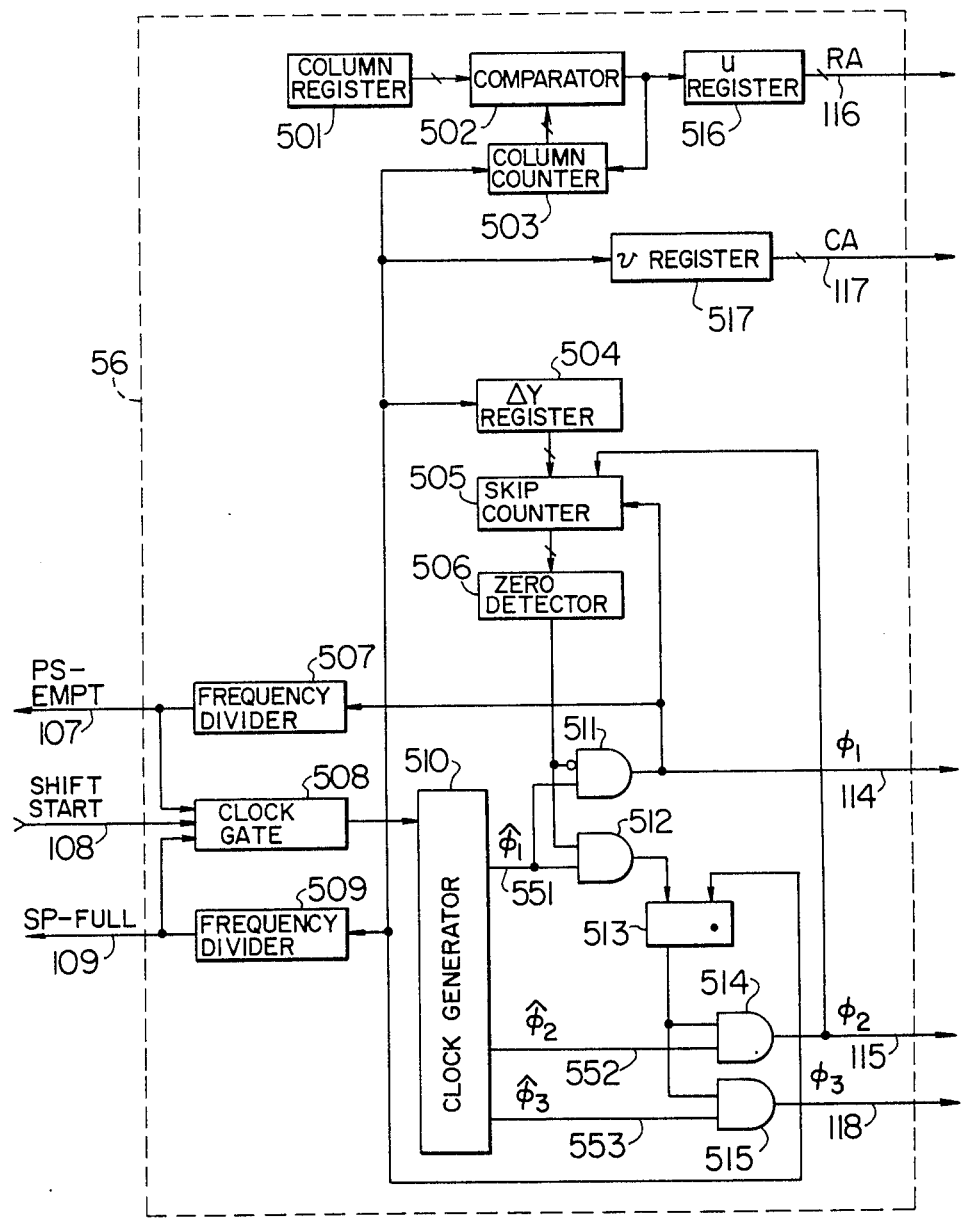

Referring now to FIG. 15, construction and operation of the shift controller 56 will be described. The shift controller 56 is started by a SHIFT-START signal 108 fed from the system controller 54. Upon receipt of the SHIFT-START signal 108, a clock gate 508 sends a clock to a clock generator 510 which generates three signals $\phi_1$ 551, $\phi_2$ 552 and $\phi_3$ 553 of different phases as shown in FIG. 16. As has already been described, the original image element data set into the PS registers 401 to 404 in the saturation calculators 62 and 63 word by word is sequentially shifted so as to be loaded on the serial buffers 405 to 408. This shifting operation is driven by a signal $\phi_1$ 114. Before the shift controller 56 is started by the SHIFT-START signal 108, the original image element data is stored in the PS registers 401 to 404 (FIG. 14) of the saturation calculators 62 and 63. However, since the serial bufers 405 to 408 are not provided with the original image element data at the first issuance of the SHIFT-START signal 108 after the commencement of the system start, it is necessary to transfer the data from each of the PS registers 401 to 404 to each of the serial buffers 405 to 408. The serial buffers 405 to 408 are two-bit shift registers and therefore, it will do that the signal $\phi_1$ 114 is generated twice for the purpose of the data transfer from the PS registers 401 to 404. Accordingly, in FIG. 15, a skip counter 505 is initialized to a constant "2" prior to the commencement of the system start. The contents of the skip counter 505 is checked by a zero detector 506. If the contents are not zero, an AND gate 511 is enabled to send the signal $\phi_1$ 114 in synchronism with the signal $\phi_1$ 551. The signal $\phi_1$ 114 shifts the contents of the PS registers 401 to 404 and serial buffers 405 to 408 by one bit and at the same time decrements the content of the skip counter 505 by $-1$. Since this operation is repeated until the content of the skip counter 505 becomes zero, data representative of initial two image elements is eventually transferred from the PS registers 401 to 404 to the serial buffers 405 to 408. When the contents of the skip counter 505 reaches zero, an AND gate 512 is enabled to set a FF 513 at the timing of the signal $\phi_1$ 551. When the FF 513 is set, AND gates 514 and 515 are respectively enabled to send the signal $\phi_2$ 115 and the signal $\phi_3$ 118 in synchronism with the signal $\phi_2$ 552 and the signal $\phi_3$ 553, respectively. In response to the signal $\phi_2$ 115, a heading data of a $\Delta Y$ register 504 is loaded on the skip counter 505. The $\Delta Y$ register 504 is thus a circulating register for storing the fundamental cycle for the periodic sequences of data representative of differences in the column numbers of the corresponding two original matrix points in the adjacent reference frames in the row direction, $\{\Delta Y_1, \Delta Y_2, \ldots, \Delta Y_S\}$. Initially, the $\Delta Y$ register 504 has a heading data of $\Delta Y_1$ which is loaded on the skip counter 505. Subsequently, the signal $\phi_3$ 118 shifts the $\Delta Y$ register 504 to update its contents to $\{\Delta Y_2, \Delta Y_3, \ldots, \Delta Y_S, \Delta Y_1\}$. When receiving the signal $\phi_2$ 115, the saturation calculators 62 and 63 calculate data representative of saturation levels for converted matrix points on the basis of the data of the serial buffers 405 to 408, vertical coordinates RA 116 and horizontal coordinates CA 117. Thereafter, upon receipt of the signal $\phi_3$ 118, the saturation calculators 62 and 63 send the results of the saturation calculation to the SP registers 411 and 412 for storage therein. The signal $\phi_3$ 118 resets the FF 513, shifts the $\Delta Y$ register 504 and a v-register 517, and increments a column counter 503 by $+1$. The v-register 517 is a shift register for storing a fundamental cycle for the periodic sequence of data representative of the horizontal coordinates $\{v_1, v_2, \ldots, v_s\}$, and it sends its heading data, as the CA 117, to the saturation calculators 62 and 63. A column register 501 is adapted to store the row length (the length of one column) of the scale-converted image in terms of image elements. A comparator 502 is adapted to compare the content of the column register 501 with the content of the column counter 503. When coincident, the comparator 502 produces a coincidence signal which drives circulative shifting of content of a u-register 516 and resets the column counter 503. The u-register 516 is a shift register for storing a fundamental cycle for the periodic sequence of data representative of the vertical coordinates $\{u_1, u_2, \ldots, u_r\}$, and it sends its heading data, as the RA 116, to the saturation counters 62 and 63. The content of the u-register 516 is initially equal to $\{u_1, u_2, \ldots, u_r\}$ but circulated through $\{u_2, u_3, \ldots, u_r, u_1\}$, $\{u_3, u_4, \ldots, u_r, u_1, u_2\}$ and so on as the shifting operation proceeds.

As will be seen from the foregoing description, the intra-matrix coordinates data necessary for the saturation calculation is provided by making reference to the contents of the circulating registers in contrast to the repetitions calculation for each individual image element pursuant to the conventional system and besides, the plurality of saturation counters make reference to the intra-matrix coordinates data in common to carry out the parallel processing.

The signal $\phi_1$ 114 shifts the contents of the PS registers 401 to 404 and serial buffers 405 to 408, and the signal $\phi_3$ 118 shifts the contents of the SP registers 411 and 412, as described previously. The PS registers 401 to 404 and the SP registers 411 and 412 are W-bit registers. Accordingly, by frequency dividing the signal $\phi_1$ 114 and the signal $\phi_3$ 118 by means of 1/W frequency dividers 507 and 509, respectively, a data empty signal (PS-EMPT) 107 for the PS registers 401 to 404 and a data full signal (SP-FULL) 109 for the SP registers 411 and 412 can be obtained. When either the PS-EMPT 107 or the SP-FULL 109 is sent to the system controller 54, the clock gate 508 is closed and the shift controller finishes operating.

Figure 17:
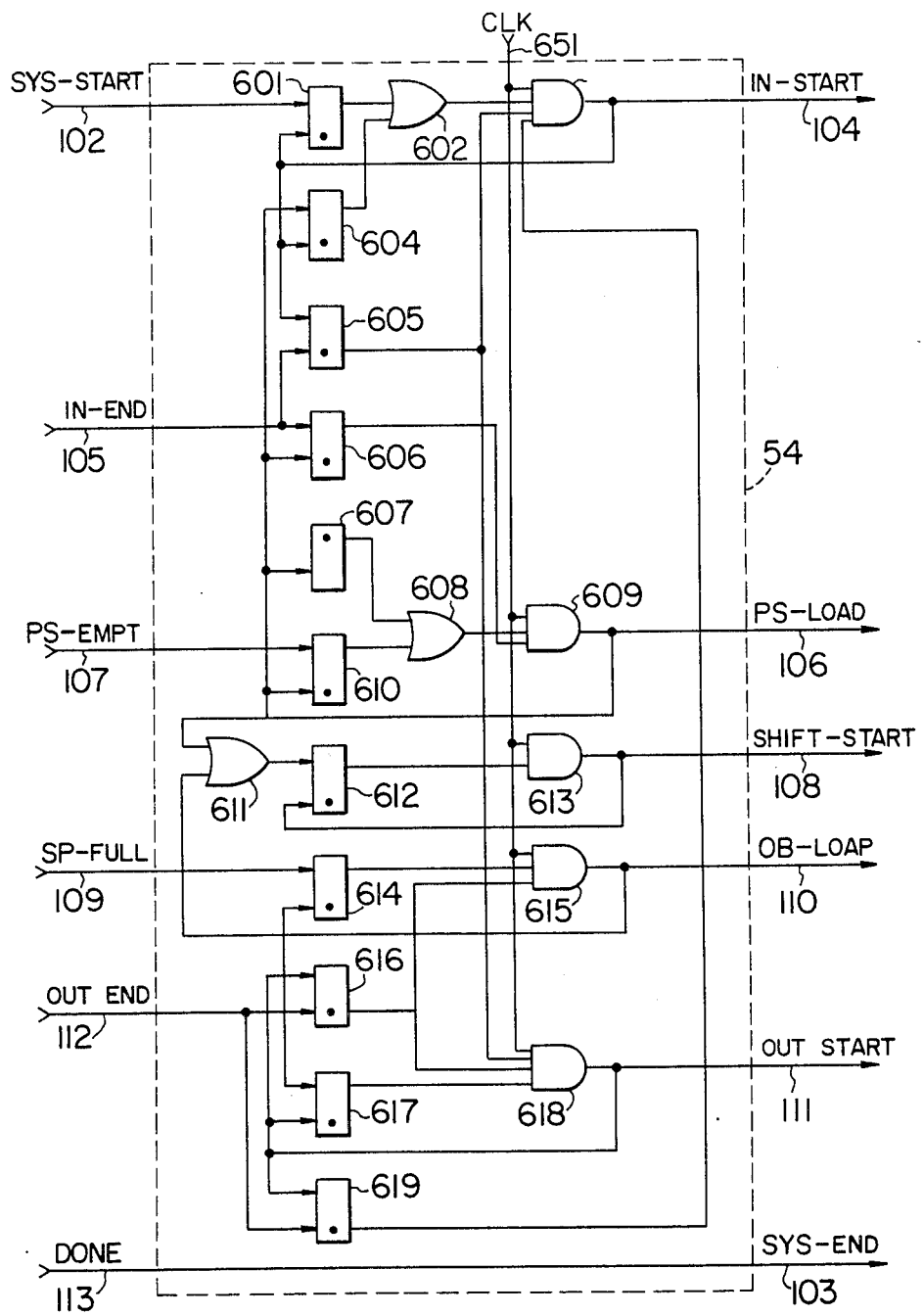

Finally, construction and operation of the system controller 54 will be described by referencing FIG. 17. The system controller 54 is started by a SYS-START signal 102 fed from the processor 52. When the SYS-START signal 102 sets a FF 601, an AND gate 603 is enabled through an OR gate 602 and an IN-START signal 104 is sent in synchronism with a fundamental clock (CLK) signal 651. The IN-START signal 104 resets the FF 601 and a FF 604 and at the same time, sets a FF 605 which indicates that the input controller has been started. The IN-START signal 104 requests the input controller 55 to effect data transfer from the image memory 51 to the input buffers 58 to 61. When the data transfer to the input buffers 58 to 61 ends, an IN-END signal 105 is fed from the input controller 55. The IN-END signal 105 resets the FF 605 indicative of the operation of the input controller 55 in progress and sets a FF 606 indicative of data input end. On the other hand, a FF 607 is initially set. Accordingly, when the FF 606 is set, an AND gate 609 is enabled and a PS-LOAD signal 106 is sent in synchronism with the clock signal (CLK) 651. Thus, following the termination of the data transfer to the input buffers 58 to 61, the PS-LOAD signal 106 is sent. By this, the PS registers 401 to 404 included in the saturation counters 62 and 63, which registers are initially supplied with no original image element data, can conveniently be loaded with the data from the input buffers 58 to 61. The PS-LOAD signal 106 sets a FF 612 through an OR gate 611 so that an AND gate is enabled and a SHIFT-START signal 108 is sent to the shift controller 56 in synchronism with the CLK 651. The PS-LOAD signal 106 also resets FFs 610 and 606 and sets FFs 607 and 604. With the FF 604 set, the AND gate 603 is enabled through the OR gate 602 (since at this time a condition that neither data input nor data output is in progress must be held, the AND gate 603 can be opened only when the FF 605 and a FF 619 are reset), and the IN-START signal 104 is sent. Thus, concurrently with the transmission of the PS-LOAD signal 106, the data transfer to the input buffers 58 to 61 is started by the IN-START signal 104 and the saturation calculators are started by the SHIFT-START signal 108. The PS-LOAD. signal 106 is issued not only when the system controller 54 receives, initially after the system start, a first IN-END signal 105 fed from the input controller 55 but also when the system controller 54 receives the PS-EMPT signal 107 fed from the shift controller 56. When the PS registers 401 to 404 in the saturation counters 62 and 63 empty of data, the PS-EMPT signal 107 indicative of the data empty is issued for loading data from the input buffers 58 to 61 on the PS registers 401 to 404. Conversely, when the SP registers 411 and 412 in the processing elements 62 and 63 are full of data, the shift controller 56 issues an SP-FULL signal 109 and this SP-FULL signal drives a FF 614 and an AND gate 615 to cause an OB-LOAD signal 110 to issue. Data in the SP registers 411 and 412 is read in response to the OB-LOAD signal 110 and written in the output buffers 64 and 65. The OB-LOAD signal 110 resets the FF 614 and at the same time, drives the OR gate 611, FF 612 and AND gate 613 so as to issue the SHIFT-START signal 108. The OB-LOAD signal 110 also drives a FF 617 and an AND gate 618 so as to issue an OUT-START signal 111. The OUT-START signal 111 starts data transfer from the output buffers 64 and 65 to the image memory 51. When the data transfer ends, the output controller 57 issues an OUT-END signal 112. The OUT-END signal 112 resets a FF 616 and the FF 619 which indicates the operation of output controller 57 in progress. When receiving a DONE signal 113 fed from the output controller 57, the system controller 54 sends a SYS-END signal 103 to the processor 52.

As has been described, the present embodiment is advantageous in the following points:

(1) For obtaining data values for four original matrix points constituting a reference frame and intramatrix coordinates data necessary for the saturation calculation of the image subject to image scale conversion, the prior art apparatus needs coordinates calculation in respect of all the image elements whereas in the present embodiment reference is made to the fundamental cycle data, i.e., calculated values in tabular form $\{u_1, u_2, \ldots, u_r\}$, $\{v_1, v_2, \ldots, v_s\}$, $\{\Delta X_1, \Delta X_2, \ldots, \Delta X_r\}$ and $\{\Delta Y_1, \Delta Y_2, \ldots, \Delta Y_s\}$. Accordingly, the apparatus can be simplified and the image scale conversion processing can be carried out at high speeds.

(2) The parallel processing may be accomplished by using a plurality of saturation counters or processing elements, and the principal controllings including controlling of execution of the processing elements (namely, transmission and updating of the intra-matrix coordinates data and shift control of the image element data) and controlling of read/write addresses of the image memory can be carried out in common. Accordingly, the apparatus can be simplified and the image scale conversion processing can be carried out at high speeds.

We claim:

1. A method of converting a first two-dimensional image on first column direction and row direction scales to a second two-dimensional image on second column direction and row direction scales (a, b) each of said first and second two-dimensional images being of image elements arranged in matrix having various data values, the ratios between said first and second scales being predtermined column direction and row direction scale factors, respectively, comprising:

first step of finding out periodicity of sequences of differences between those column and row order numbers in the first image element matrix which are particularly related in the scale conversion to coordinates of second image elements and those column and row order numbers in the first image element matrix which are particularly related to coordinates of second image elements adjacent to the first-mentioned second image elements, and determining data sequences for the periods of said respective sequences of said differences, said determined data sequences being representative of positional relations between said first image elements and second image elements (Q) with respect to said periods, and said positional relations being defined by said column direction and row direction scale factors;

second step of storing in a memory at least one period of said determined sequences; and third step of determining a position of each of said second image elements with respect to said particularly related column and row order numbers by referring to said data stored in said memory.

2. A method according to claim 1, further comprising:

fourth step of determining a data value for each of said second image elements on the basis of the data value for at least one of those first image elements which lie on the columns and rows carrying said particularly related column order numbers and row order numbers.

3. A method according to claim 2, in which said fourth step is carried out by referring to the data value for said at least one first image element and said data stored in said memory.

4. A method according to claim 2, in which said fourth step includes determining a data value for said each second image element on the basis of the data value for said at least one first image element and two-dimensional coordinates of said each second image element.

5. A method according to claim 1, in which said first step includes dividing said column direction and row direction scales by first and second positive integers to define coordinates positions on said first image, said coordinates positions being determined in correspondence with each of said second image elements.

6. A method according to claim 1, in which said memory is a read-only memory.

7. A method according to claim 1, in which said periodicity of the relation between the positions of said first image and said second image elements are determined by said first scales and second scales depending on said first scales and said predetermined scale factors.

8. A method of converting a first two-dimensional image on first column direction and row direction scales to a second two-dimensional image on second column direction and row direction scales, each of said first and second two-dimensional images being of image elements arranged in matrix having various data values, the row and column directions in the first image element matrix being parallel with those in the second image element matrix, respectively, comprising the steps of:

determining, on the basis of the ratios between said first scales and second scales, data sequences for first fundamental cycles for column direction and row direction periodic sequences of data which first fundamental cycles of data define the positional relation between the position on said first image corresponding to any one of said second image elements and four first image elements lying on the intersections between two adjacent rows and two adjacent columns in said first image element matrix surrounding the position of said one second image element on said first image, said four first image elements constituting a reference frame for said one second image element;

determining a reference frame for each of said second image elements on the basis of said data sequences for said first fundamental cycles;

producing the vertical and horizontal coordinates for each of said second image elements within its associated reference frame on the basis of said ratios between said first scales and second scales; and calculating a data value for each of said second image elements on the basis of the data value for at least one of the four first image elements of its associated reference frame and said vertical and horizontal coordinates of the position on said first image corresponding to the said second image element.

9. A method according to claim 8, in which said step of producing the coordinates of said second image elements includes:

determining, on the basis of said ratios between said first and second scales, data sequences for second fundamental cycles for vertical and horizontal periodic sequences of data, which second fundamental cycles of data define the coordinates of the positions on said first image corresponding to said second image elements; and calculating the coordinates for each of said second image elements within its associated reference frame on the basis of said data sequences for said second fundamental cycles.

10. A method according to claim 8, in which said data sequence for said first fundamental cycle for the column direction periodic sequence of data defines the difference in row number between one first image element in the reference frame for one of said second image elements and that first image element in the reference frame for the adjacent second image element in the column direction which lies on the same column as said one first image element in the reference frame for said one second image element, while said data sequence for said first fundamental cycle for the row direction periodic sequence of data defines the difference in column number between one first image element in the reference frame for one of said second image elements and that first image element in the reference frame for the adjacent second image element in the row direction which lies on the same row as said one first image element in the reference frame for said one second image element.

11. A method according to claim 10, further comprising the steps of:

determining a first positive integer such that the product of said first positive integer and said ratio between said first and second column direction scales for said first and second image matrices constitutes a column side division factor (r) which is equal to a positive integer not less than 2, and determining a second positive integer such that the product of said second positive integer and said ratio between the row direction scales for said first and second image matrices constitutes a row side division factor (s) which is equal to a positive integer not less than 2; and dividing each of said reference frames in said first image element matrix into a (r×s) sub-matrix where the column and row sides of said each reference frame are divided by r and s, respectively, so that said second image elements lie on different intersections in said sub-matrices;

whereby the period for each of said first and second fundamental cycles for the column direction periodic sequences of data is identical with r while the period for each of said first and second fundamental cycles for the row direction periodic sequences of data is identical with s.

12. An apparatus for converting a first two-dimensional image on first column direction and row direction scales to a second two-dimensional image on second column direction and row direction scales, each of said first and second two-dimensional images being of image elements arranged in matrix having various data values, in which the position on said first image corresponding to each of said second image elements is associated with a reference frame constituted by four first image elements lying on the intersections of two adjacent rows and two adjacent columns in the first image element matrix surrounding said second image element, the apparatus comprising:

means for determining, on the basis of the ratios between said first scales and said second scales, data sequences for first fundamental cycles for column direction and row direction periodic sequences of data, which first fundamental cycles of data define the positional relation between said second image elements and their associated reference frames in said first image element matrix;

means coupled with said data sequences for said first fundamental cycles determining means for determining a reference frame for each of said second image elements;

means for producing the vertical and horizontal coordinates for each of said second image elements within its associated reference frame on the basis of the ratios between said first and second scales; and means coupled with said reference frame determining means and with said coordinates producing means for calculating a data value for each of said second image elements.

13. An apparatus according to claim 12, in which said coordinates producing means includes means for determining, on the basis of said ratios between said first and second scales, data sequences for second fundamental cycles for vertical and horizontal periodic sequences of data, which second fundamental cycles of data define said coordinates for said second image elements and means coupled with said data sequences for said second fundamental cycles determining means for calculating said coordinates.

14. An apparatus according to claim 13, in which the product of a first positive integer and said ratio between said first and second column direction scales for said first and second image element matrices constitutes a column side division factor (r) which is equal to a positive integer not less than 2, and the product of a second positive integer and said ratio between said first and second row direction scales for said first and second image element matrices constitutes a row side division factor (s) which is equal to a positive integer not less than 2, so that the periods for said second fundamental cycles for the vertical and horizontal periodic sequences of data are constituted by r and s, respectively.

15. An apparatus according to claim 12, in which said data sequence for said first fundamental cycle for the column direction periodic sequence of data defines the difference in row number between one first image element in the reference frame for one of said second image elements and that first image element in the reference frame for the adjacent second image element in the column direction which lies on the same column as said one first image element in the reference frame for said one second image element, while said data sequence for said first fundamental cycle for the row direction periodic sequence of data defines the differences in column number between one first image element in the reference frame for one of said second image element and that first image element in the reference frame for the adjacent second image element in the row direction which lies on the same row as said one first image element in the reference frame for said one second image element.

16. An apparatus according to claim 15, in which the product of a first positive integer and said ratio between said first and second column direction scales for said first and second image element matrices constitutes a column side division factor (r) which is equal to a positive integer not less than 2, and the product of a second positive integer and said ratio between said first and second row direction scales for said first and second image element matrices constitutes a row side division factor (s) which is equal to a positive integer not less than 2, so that the periods for said second fundamental cycles for the vertical and horizontal periodic sequences of data are constituted by r and s, respectively.

17. A method of enlarging or reducing a first two-dimensional image of image elements arranged in matrix with predetermined column direction and row direction scale factors to form a second two-dimensional image of image elements arranged in matrix, where an image element at the intersection between i-th row and j-th column in the matrix for said first image is represented by $P_{ij}$, an image element at the intersection between m-th row and n-th column in the matrix for said second image and surrounded by four first image elements $P_{X_mY_n}$, $P_{X_{m+1}Y_n}$, $P_{X_mY_{n+1}}$ and $P_{X_{m+1}Y_{n+1}}$ is represented by $Q_{mn}$, and the vertical and horizontal coordinates of said second image element within the rectangular region defined by said four first image elements are represented by $u_m$ and $v_n$, respectively, the method comprising:
determining data sequences for fundamental cycles for periodic sequences of data $\Delta X_m = X_{m+1} - X_m$, $\Delta Y_n = Y_{n+1} - Y_n$, $u_m$ and $v_n$ on the basis of said scale factors;
storing previously said data sequences for said fundamental cycles for periodic sequences of data $\Delta X_m$, $\Delta Y_n$, $u_m$ and $v_n$, in a memory;
determining said coordinates $u_m$ and $v_n$ of each of said second image elements by referring to said data sequences for said fundamental cycles; and
calculating data values for said second image elements.

18. A method according to claim 17, in which said data value calculating step is carried out simultaneously for those second image elements which are on m-th and (m+kL)-th rows (k=1, 2, . . . ) on the same columns where L is an integral number times the period of the fundamental cycle for said periodic sequences of data $\Delta X_m$ and $u_m$.

19. An apparatus for enlarging or reducing a first two-dimensional image of image elements arranged in a matrix with predetermined column direction and row direction scale factors to form a second two-dimensional image of image elements arranged in a matrix, where an image element at the intersection between the i-th row and j-th column in the matrix for said first image is represented by $P_{ij}$, an image element at the intersection between the m-th row and the n-th column in the matrix for said second image and surrounded by four first image elements $P_{X_mY_n}$, $P_{X_{m+1}Y_n}$, $P_{X_mY_{n+1}}$ and $P_{X_{m+1}Y_{n+1}}$ by $Q_{mn}$, and the vertical and horizontal coordinates of said second image element within the rectangular region defined by said four first image elements are represented by $u_m$ and $v_n$, respectively, the apparatus comprising:
first means for storing image element data of said first image;
second means for previously storing data sequences for fundamental cycles for periodic sequences of data $\Delta X_m = X_{m+1} - X_m$ and $\Delta Y_n = Y_{n+1} - Y_n$;
third means coupled to said first means for reading out image element data, identified by addresses updated by said data sequences for said fundamental cycles of data $\Delta X_m$ and $\Delta Y_n$, from said first means and for temporarily storing the read out data;
fourth means for previously storing data sequences for fundamental cycles for periodic sequences of data of said vertical and horizontal coordinates $u_m$ and $v_n$; and
fifth means coupled to said third and fourth means for calculating data values for said second image elements on the basis of said data sequences for said fundamental cycles for said vertical and horizontal coordinates data $u_m$ and $v_n$ successively read out from said fourth means and said image element data successively read out from said third means.

20. An apparatus for enlarging or reducing a two-dimensional image of image elements arranged in a matrix with predetermined column direction and row direction scale factors, comprising:
a memory for storing data for said image elements;
means for successively generating first and second sets of addresses of two adjacent rows or columns of the image element matrix in said memory, said second set of addresses being spaced a predetermined interval from said first set of addresses;
means for updating said first and second sets of addresses in accordance with periods determined by said scale factors;
means coupled to said memory for reading out the image element data identified by said first and second sets of addresses and for temporarily storing said read out data;
means for storing data sequences for fundamental cycles for periodic sequences of data of vertical and horizontal coordinates of image elements of an enlarged or reduced two-dimensional image; and
a first operation unit coupled to said coordinates data storing means and said memory for calculating data values for image elements of said enlarged or reduced two-dimensional image on the basis of said data sequences for said fundamental cycles of said coordinates data and image element data identified by said first set of addresses, and a second operation unit coupled to said coordinates data storing means and said memory for calculating data values for other image elements of said enlarged or reduced image on the basis of said data sequences for said fundamental cycles of said coordinates data and image element data identified by said second set of addresses.

* * * * *